(12) United States Patent
Ogawa

(10) Patent No.: US 8,520,293 B2
(45) Date of Patent: Aug. 27, 2013

(54) DISPLAY SHEET, DISPLAY DEVICE, AND ELECTRONIC APPARATUS

(75) Inventor: Satoshi Ogawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 161 days.

(21) Appl. No.: 12/898,930

(22) Filed: Oct. 6, 2010

(65) Prior Publication Data

US 2011/0085226 A1    Apr. 14, 2011

(30) Foreign Application Priority Data

Oct. 14, 2009  (JP) .................................. 2009-237399
Jul. 20, 2010  (JP) .................................. 2010-163285

(51) Int. Cl.
*G02B 26/00* (2006.01)

(52) U.S. Cl.
USPC ...................................................... 359/296

(58) Field of Classification Search
USPC ............. 359/296; 345/107, 105, 49; 430/32, 430/34, 38; 204/600, 450
See application file for complete search history.

(56) References Cited

U.S. PATENT DOCUMENTS

| | | | |
|---|---|---|---|
| 3,892,568 A * | 7/1975 | Ota ................................. | 430/19 |
| 6,680,726 B2 * | 1/2004 | Gordon et al. ................. | 345/107 |
| 7,072,095 B2 * | 7/2006 | Liang et al. ................... | 359/296 |
| 7,110,164 B2 * | 9/2006 | Paolini et al. ................. | 359/296 |
| 7,170,506 B2 * | 1/2007 | Eldon et al. ................... | 345/207 |
| 7,193,770 B2 | 3/2007 | Kanbe | |
| 7,205,355 B2 | 4/2007 | Liang et al. | |
| 7,283,119 B2 * | 10/2007 | Kishi ............................ | 345/107 |
| 7,307,780 B2 | 12/2007 | Kanbe | |
| 7,344,750 B2 | 3/2008 | Chopra et al. | |
| 2010/0060628 A1 | 3/2010 | Lenssen et al. | |

FOREIGN PATENT DOCUMENTS

| | | |
|---|---|---|
| JP | A-2004-20758 | 1/2004 |
| JP | A-2007-58151 | 3/2007 |
| JP | A-2007-310395 | 11/2007 |
| JP | A-2009-251048 | 10/2009 |

* cited by examiner

*Primary Examiner* — Tuyen Tra
(74) *Attorney, Agent, or Firm* — Oliff & Berridge, PLC

(57) ABSTRACT

A display sheet includes a display layer that has a first display layer having multiple first containers each containing a first electrophoretic particle group and a second display layer disposed on one surface side of the first display layer and having multiple second containers each containing a second electrophoretic particle group. Each of the multiple first containers overlaps at least one of the multiple second containers in a planar view of the display layer.

14 Claims, 23 Drawing Sheets

DISPLAY SHEET, DISPLAY DEVICE, AND ELECTRONIC APPARATUS

This application claims priority to Japanese patent applications No. 2009-237399 filed Oct. 14, 2009 and No. 2010-163285 filed Jul. 20, 2010, and the said application is herein incorporated in the present specification.

BACKGROUND

1. Technical Field

The present invention relates to a display sheet, a display device, and an electronic apparatus.

2. Related Art

For example, an electrophoretic display utilizing electrophoresis of particles is known as a device constituting an image display portion of an electronic paper (for example, see JP-A-2007-58151). The electrophoretic display is excellent in transportability and power-saving ability and, therefore, is particularly suitable as an image display portion of an electronic paper.

JP-A-2007-58151 discloses an electrophoretic display device (display sheet) having a pair of oppositely arranged electrodes (a common electrode and a plurality of pixel electrodes) and a display layer disposed between the electrodes and provided with multiple microcapsules filled with a dispersing liquid in which electrophoretic particles are dispersed. The electrophoretic display device in JP-A-2007-58151 is constituted so as to change a color displayed on a display surface by causing migration of the electrophoretic particles in the microcapsules by means of an electric field formed in the microcapsules by applying a voltage between the pair of electrodes.

However, in the electrophoretic display device of JP-A-2007-58151, the microcapsules are disposed not to overlap each other in the thickness direction of the display layer. That is, the display layer is constituted of a microcapsule layer formed as a single layer.

In the electrophoretic display device having such a structure, a part of light beams that enter from the display surface to the display layer passes through the boundaries between adjacent microcapsules and passes through the display layer without striking the electrophoretic particles (without being reflected or absorbed). Therefore, the electrophoretic display device has a problem that the reflectance of an incident light beam at the display layer is reduced and, thereby, that the brightness of an image displayed on the display surface cannot be sufficiently increased.

In addition, in the electrophoretic display device in such a structure, since it is difficult to make the particle diameters of the multiple microcapsules contained in the display layer uniform, gaps tend to be formed between adjacent microcapsules. The formation of the gaps prevents a change in color at the regions of the display surface corresponding to the gaps, which also causes a problem that the display contrast of the display sheet is decreased. Furthermore, the formation of the gaps causes a problem that the above-described reflectance of an incident light beam is further reduced.

SUMMARY

An advantage of some aspects of the invention is to provide a display sheet, a display device, and an electronic apparatus that can increase the brightness of images displayed on its display surface and also improve its display contrast.

The advantage can be achieved by the following invention.

The display sheet of the invention includes a display layer that has a first display layer including multiple first containers each containing a first electrophoretic particle group and a second display layer disposed on one surface side of the first display layer and including multiple second containers each containing a second electrophoretic particle group, wherein each of the multiple first containers overlaps at least one of the multiple second containers in a planar view of the display layer.

With this, in the light beams enter from the display surface, a light beam passing through the first display layer can be reflected or absorbed by the second electrophoretic particles in the second container contained in the second display layer. Therefore, the brightness of an image displayed on the display surface can be increased, and also a display sheet of which display contrast is improved can be provided. In particular, when a driving circuit for driving the display sheet is provided on the opposite side of the first display layer with respect to the second display layer, light leakage toward the driving circuit is inhibited by the above-mentioned effects, which can inhibit circuit elements from malfunctioning due to photo-leakage current.

In the display sheet of the invention, the first electrophoretic particle group preferably includes first positively-charged particles that are positively charged and first negatively-charged particles that are negatively charged and have a color different from that of the first positively-charged particles; and the second electrophoretic particle group preferably includes second positively-charged particles that are positively charged and have the same color as that of the first positively-charged particles and second negatively-charged particles that are negatively charged and have the same color as that of the first negatively-charged particles.

By doing so, a desired image can be clearly displayed on the display surface.

In the display sheet of the invention, when an electric field in the thickness direction of the display layer is applied to a predetermined first container and the second container overlapping the first container, at least a part of the first electrophoretic particle group contained in the first container and at least a part of the second electrophoretic particle group contained in the second container preferably show similar behavior.

With this, in the light beams enter from the display surface, a light beam passing through the first display layer can be reflected or absorbed by the second electrophoretic particles in the second container contained in the second display layer. Therefore, the brightness of an image displayed on the display surface can be increased, and also the display contrast is improved.

In the display sheet of the invention, when an electric field in the thickness direction of the display layer is applied to a predetermined first container and the second container overlapping the first container, both the first positively-charged particles and the second positively-charged particles preferably migrate toward one surface side of the display layer, and both the first negatively-charged particles and the second negatively-charged particles preferably migrate toward the other surface side of the display layer.

With this, in the light beams enter from the display surface, a light beam passing through the first display layer can be reflected or absorbed by the second electrophoretic particles in the second container contained in the second display layer. Therefore, the brightness of an image displayed on the display surface can be increased, and also the display contrast is improved.

In the display sheet of the invention, the average maximum width of the multiple first containers in a planar view of the display layer is preferably equal to that of the multiple second containers.

By doing so, the structure of the display sheet can be simplified.

In the display sheet of the invention, when an x-axis and a y-axis are set so as to perpendicularly intersect each other in a planar view of the display layer, each of the second containers preferably partially overlaps at least one of the first containers so as to shift from each other in at least one axial direction of the x-axis and the y-axis.

By doing so, the light beam passing through the first display layer can be more surely reflected or absorbed by the second electrophoretic particle group.

In the display sheet of the invention, the average maximum width of the multiple first containers is preferably different from that of the multiple second containers in a planar view of the display layer.

By doing so, the second containers can be relatively easily arranged at positions corresponding to the portions (gaps) where the first containers are not provided in the first display layer.

In the display sheet of the invention, the average maximum width of the multiple first containers is preferably narrower than that of the multiple second containers in a planar view of the display layer.

By doing so, since the total area where the first containers are not disposed in the first display layer can be reduced, the shielding ratio of an incident light beam on the first display layer can be increased. Thus, by increasing the shielding ratio of the incident light beam at the first display layer, a clearer image can be displayed on the display surface.

In the display sheet of the invention, an intermediate layer is preferably disposed between the first display layer and the second display layer.

By doing so, the first display layer and the second display layer can be separated from each other. For example, the first containers are prevented from penetrating to the second display layer, and, conversely, the second containers are prevented from penetrating to the first display layer.

In the display sheet of the invention, the intermediate layer is preferably electrically conductive in the thickness direction of the intermediate layer and is preferably electrically non-conductive in the lateral direction.

By doing so, when an electric field in the thickness direction of the display sheet is applied to the first display layer and the second display layer, the current can be prevented from flowing in the lateral direction of the intermediate layer. That is, the intermediate layer is prevented from forming a leak path, and a desired image can be displayed on the display surface.

In the display sheet of the invention, the first containers or the second containers or the both are preferably microcapsules.

By doing so, the structure of the display sheet is simplified.

In the display sheet of the invention, both the first containers and the second containers are preferably microcapsules.

By doing so, the structure of the display sheet is simplified. In addition, the first display layer and the second display layer can be each provided with elasticity to a certain extent and thereby can effectively release or absorb external force, such as pressing force, applied to the first and the second display layers. Furthermore, the first and the second display layers can be provided with excellent flexibility thereby to make the display sheet flexible.

In the display sheet of the invention, either the first containers or the second containers is preferably the microcapsules, and the other is preferably cells including a container box having recesses and a lid covering the openings of the recesses.

By thus employing the microcapsules as the first or the second containers and the cells as the other, external force, such as pressing force, applied to the display sheet can be effectively released or absorbed, while ensuring the mechanical strength of the display sheet.

In the display sheet of the invention, the first containers are preferably microcapsules, and the second containers are preferably the cells.

By thus employing the microcapsules as the first containers that are positioned on the display surface side, external force, such as pressing force, applied to the display surface can be effectively released or absorbed.

The display device of the invention includes a display sheet of the invention and a pair of electrodes that are oppositely arranged with the display layer therebetween.

By doing so, the brightness of an image displayed on the display surface can be increased, and also the display device having improved display contrast can be provided.

In the display device of the invention, the pair of electrodes preferably include a common electrode disposed on the second display layer side and arranged so as to contain the display layer; and a partial electrode disposed on the first display layer side so as to be movable with respect to the display sheet and being able to apply a voltage to a partial region of the display layer between the partial electrode and the common electrode.

By doing so, since the color can be changed only at the portion positioned on the course of the partial electrode of the display surface, an image can be drawn on the display surface by moving the partial electrode, like drawing a picture on paper with a pencil. Therefore, the operability (usability) of the display device is improved.

In the display device of the invention, the common electrode is preferably detachable from the display sheet.

Since the common electrode is unnecessary (not having specific roles) after an image has been displayed on the display layer, the convenience of the display device is improved by making the common electrode detachable from the display sheet.

The electronic apparatus of the invention include the display device of the invention.

By doing so, the brightness of an image displayed on the display surface can be increased, and also the electronic apparatus having improved display contrast can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

The display sheet, the display device and the electronic apparatus of the invention will now be described in detail based on exemplary embodiments shown in the accompanied drawings.

Display Device

First Embodiment

First, a first embodiment of the display device (display device of the invention) to which the display sheet of the invention is applied will be described.

Figure 1:
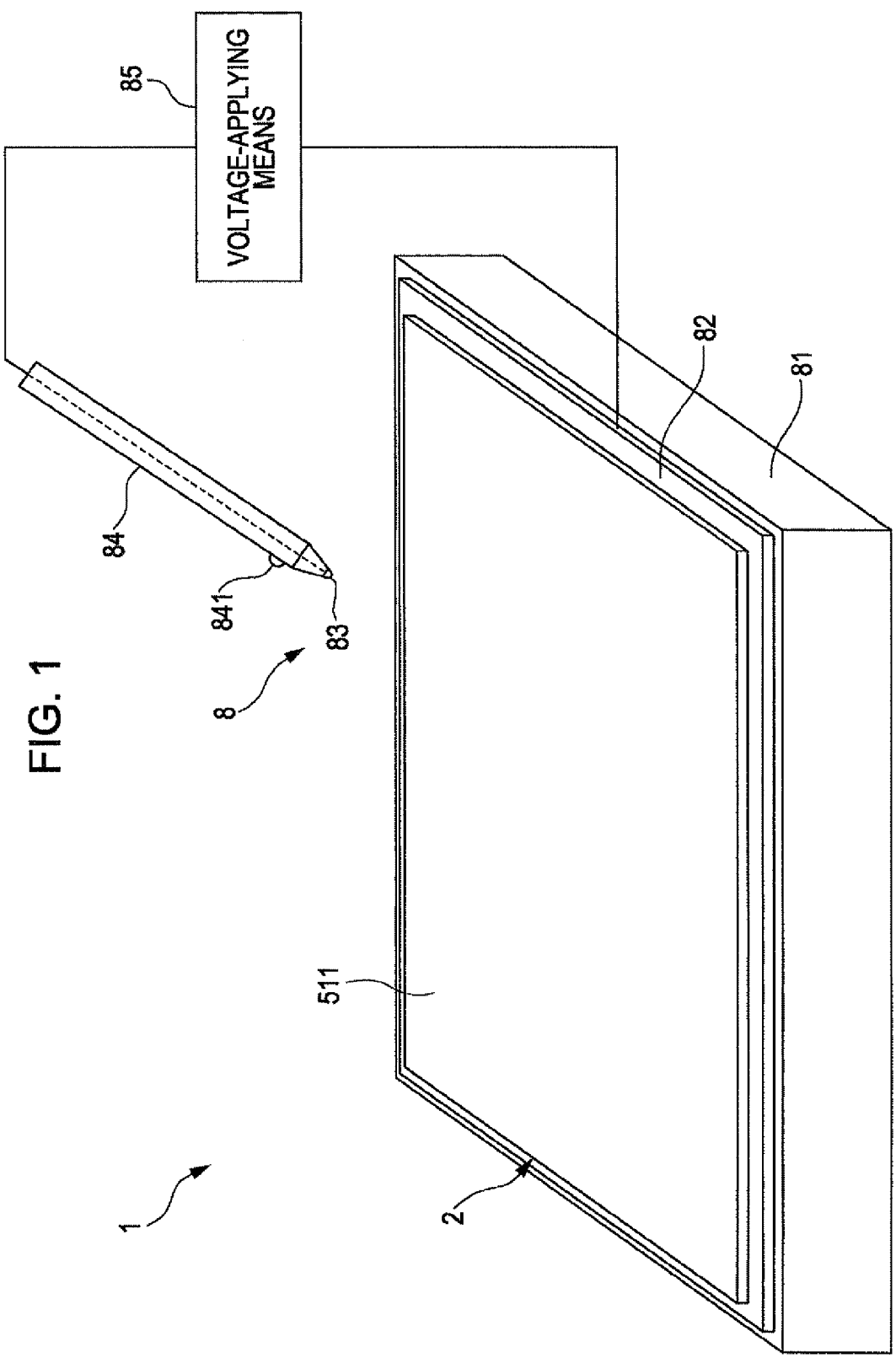
FIG. 1 is a perspective view schematically illustrating a first embodiment of the display device of the invention.
Figure 2:
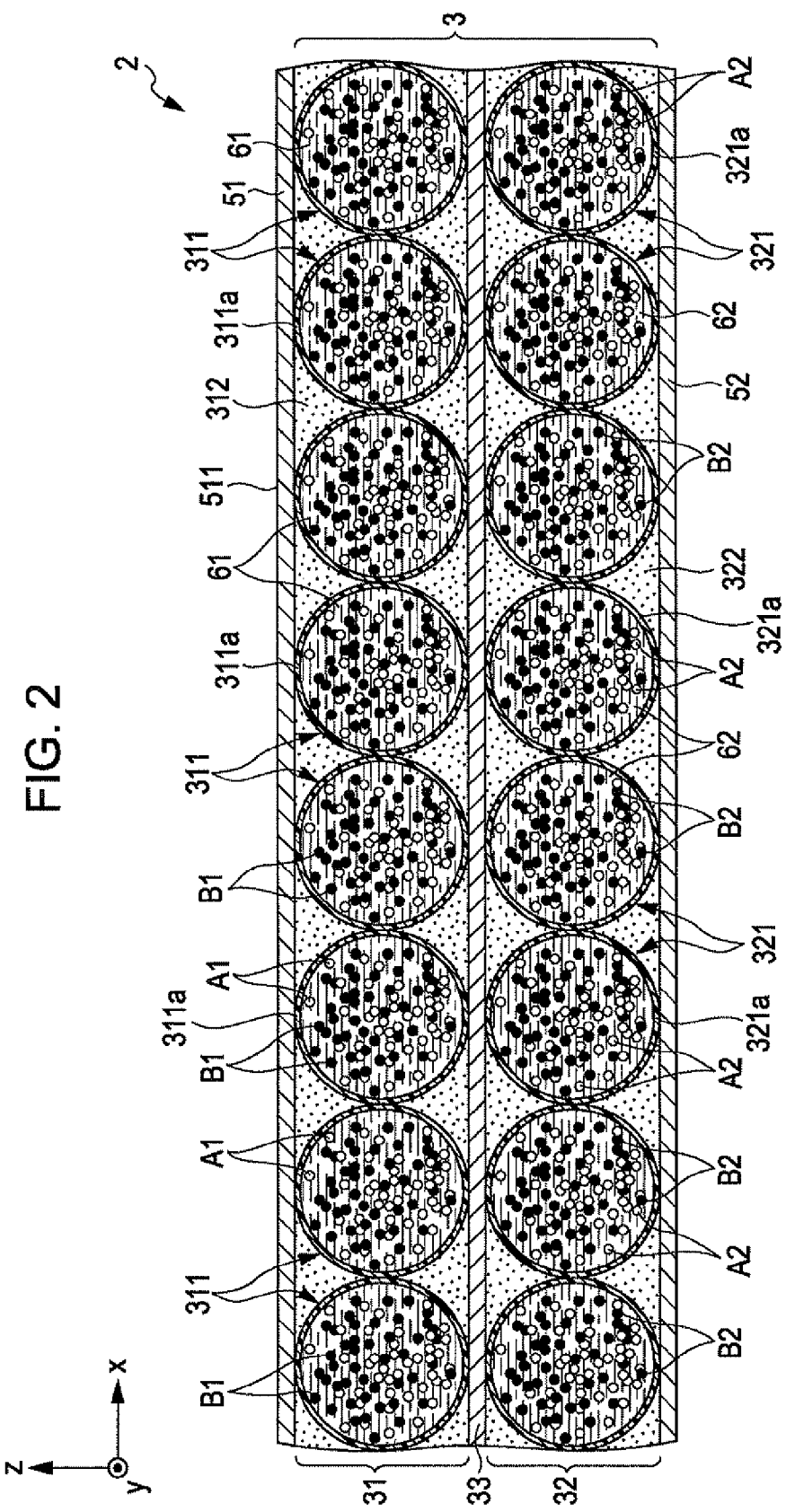
FIG. 2 is a cross-sectional view of a display sheet fitted to the display device shown in FIG. 1.
Figure 3:
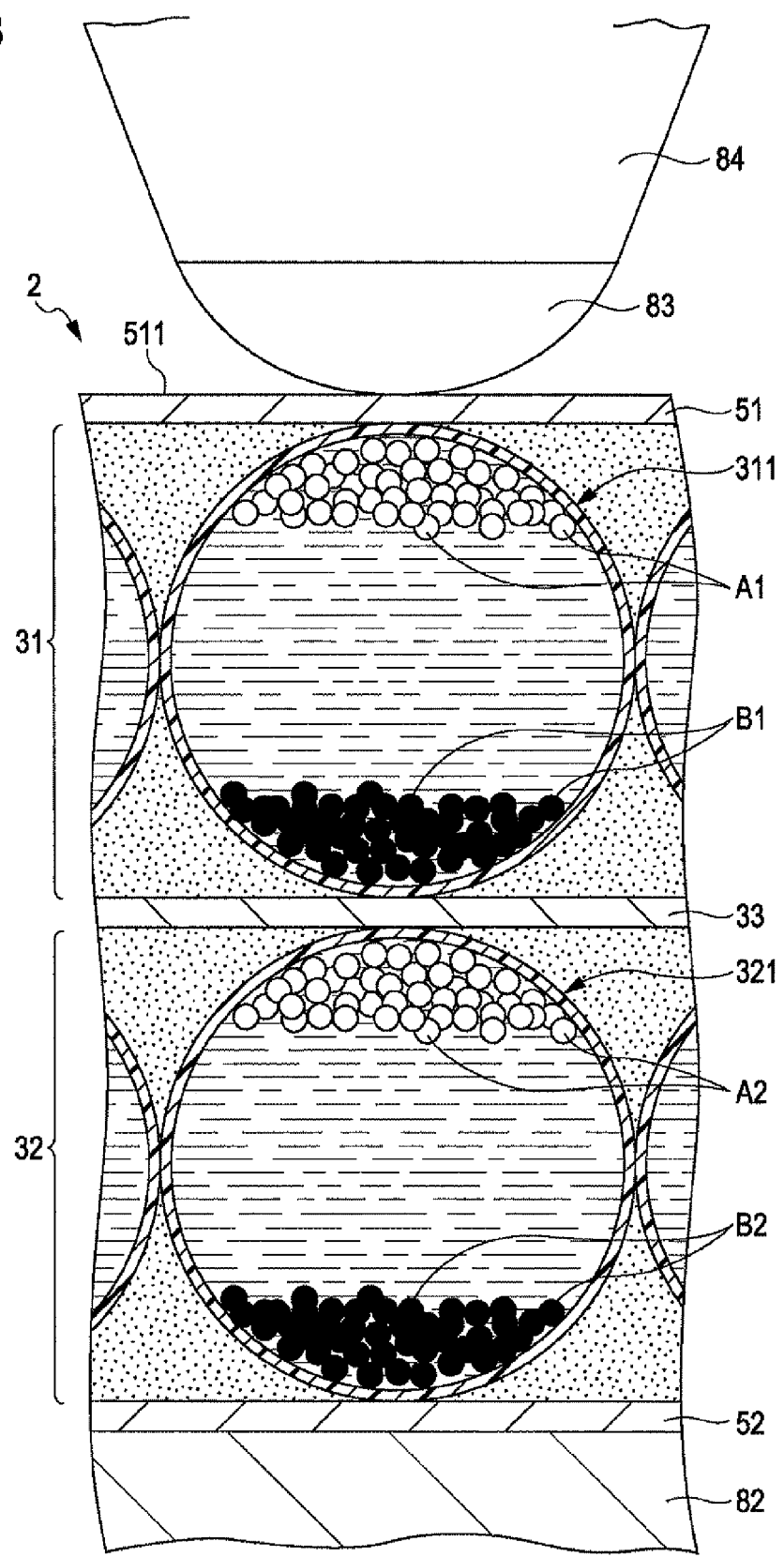
FIG. 3 is a cross-sectional view illustrating an action of the display device shown in FIG. 1.
Figure 4:
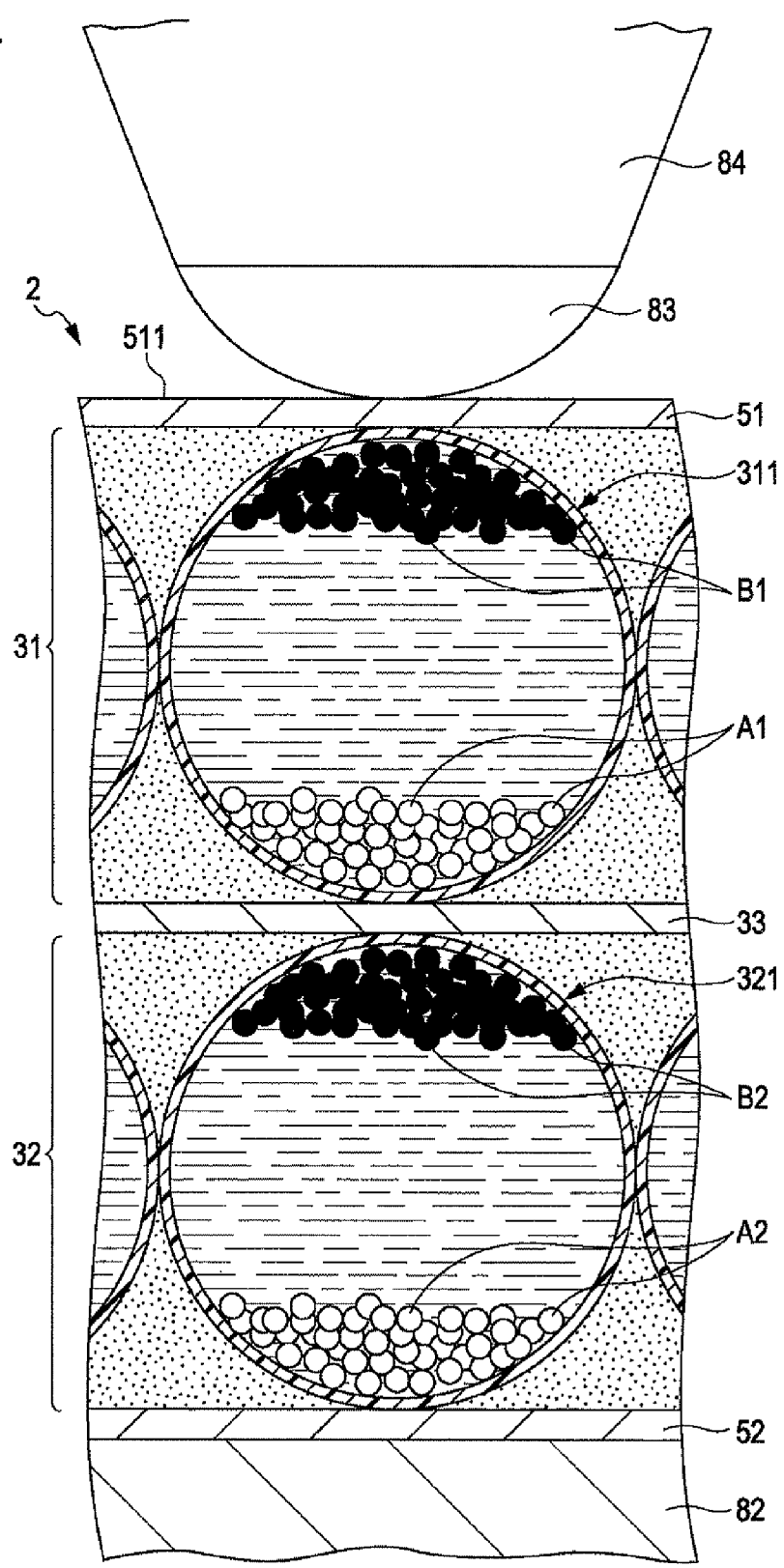
FIG. 4 is a cross-sectional view illustrating an action of the display device shown in FIG. 1.
Figure 5:
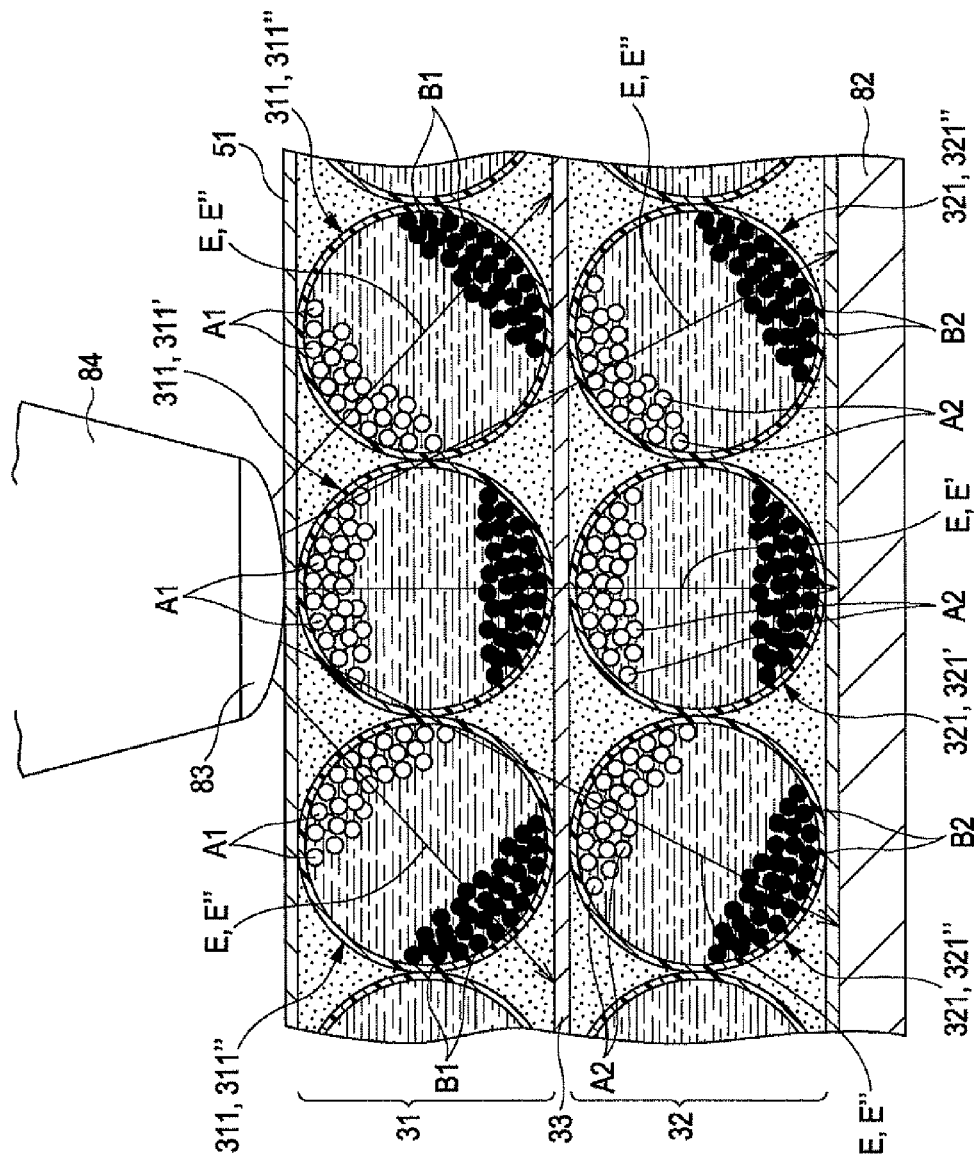
FIG. 5 is a cross-sectional view illustrating an action of the display device shown in FIG. 1.
Figure 6:
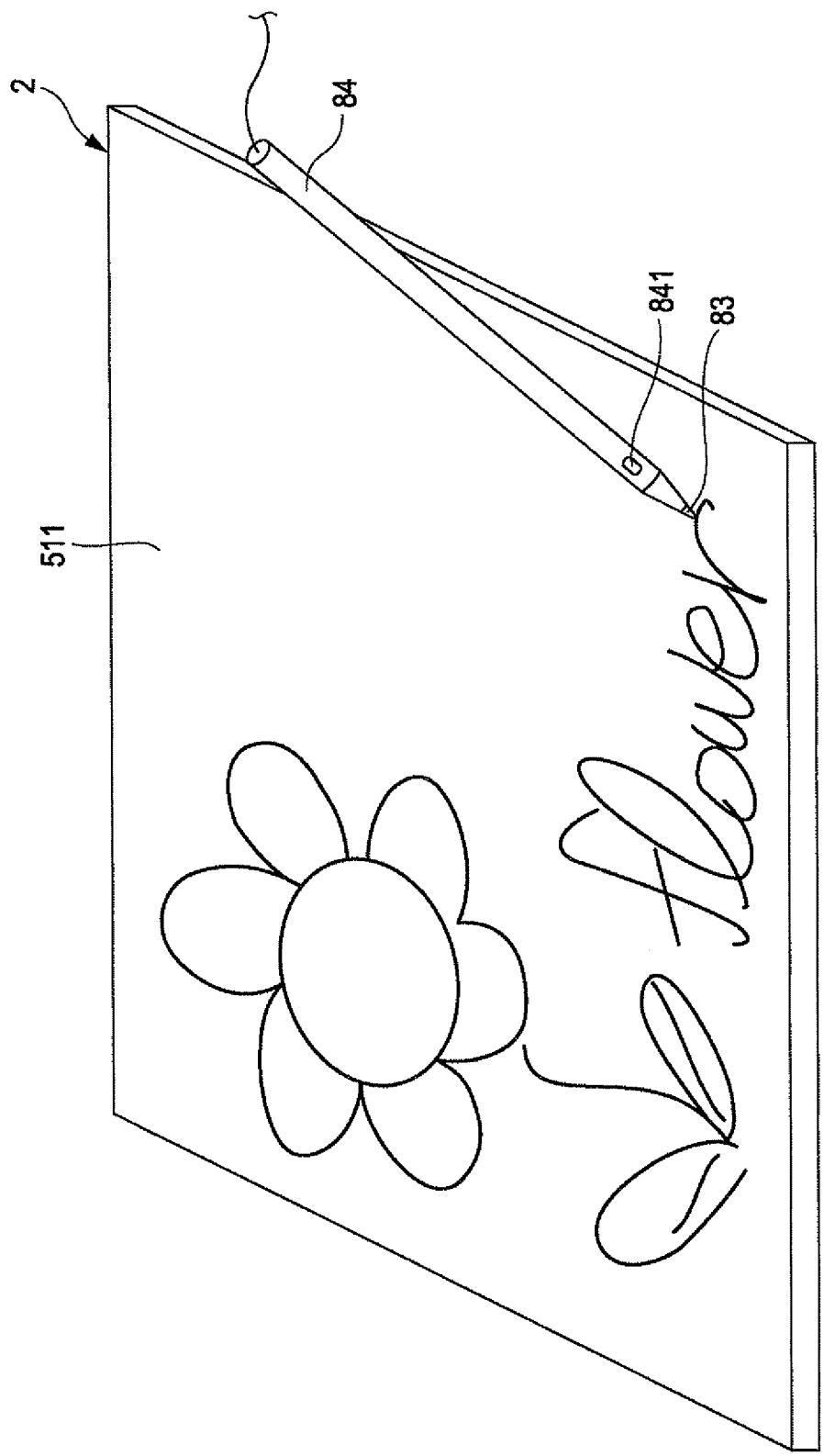
FIG. 6 is a diagram showing a display sheet on which a desired image is written.
Figure 7:
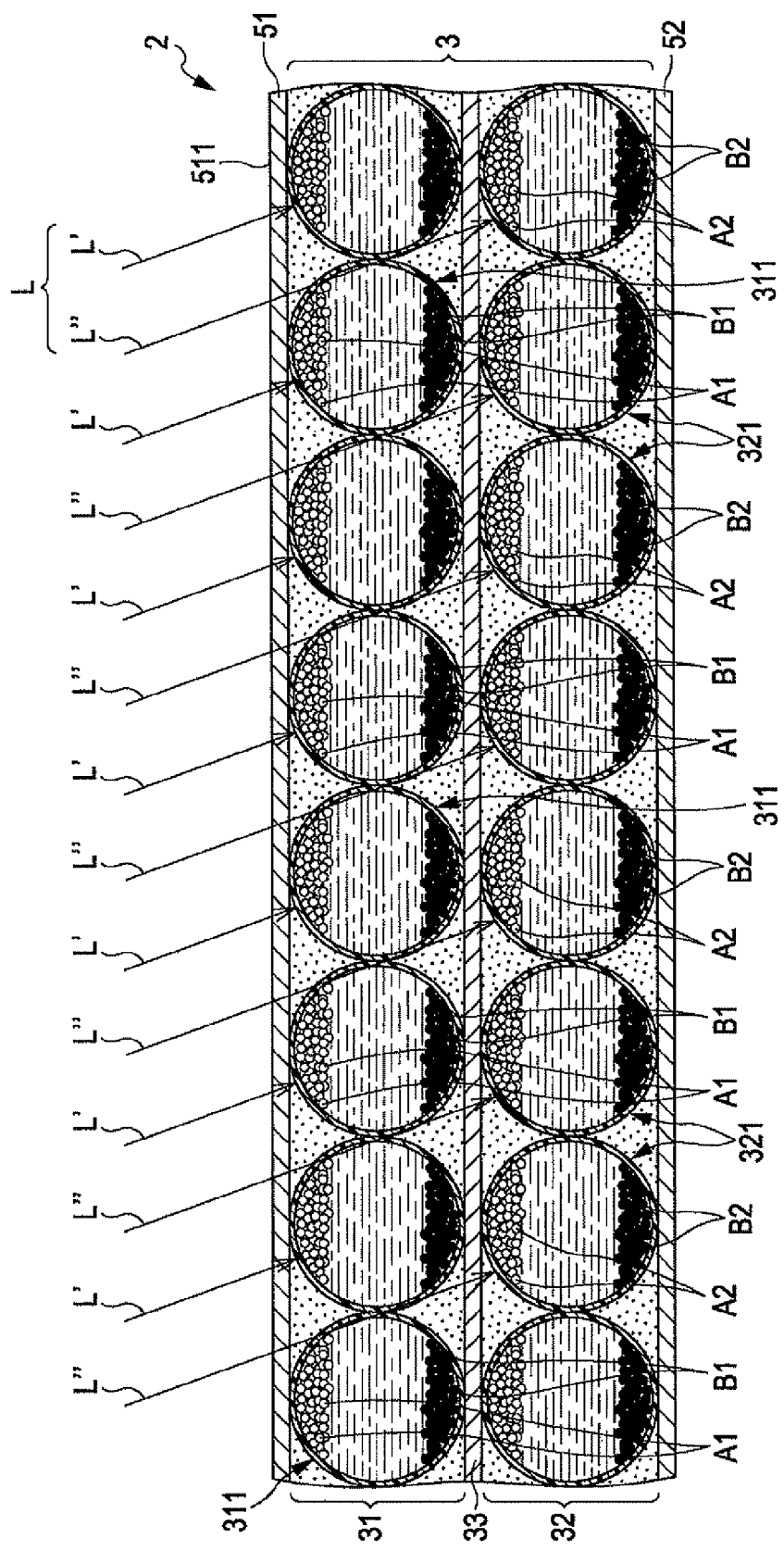
FIG. 7 is a cross-sectional view illustrating paths of light beams incident on the display sheet.
Figure 8:
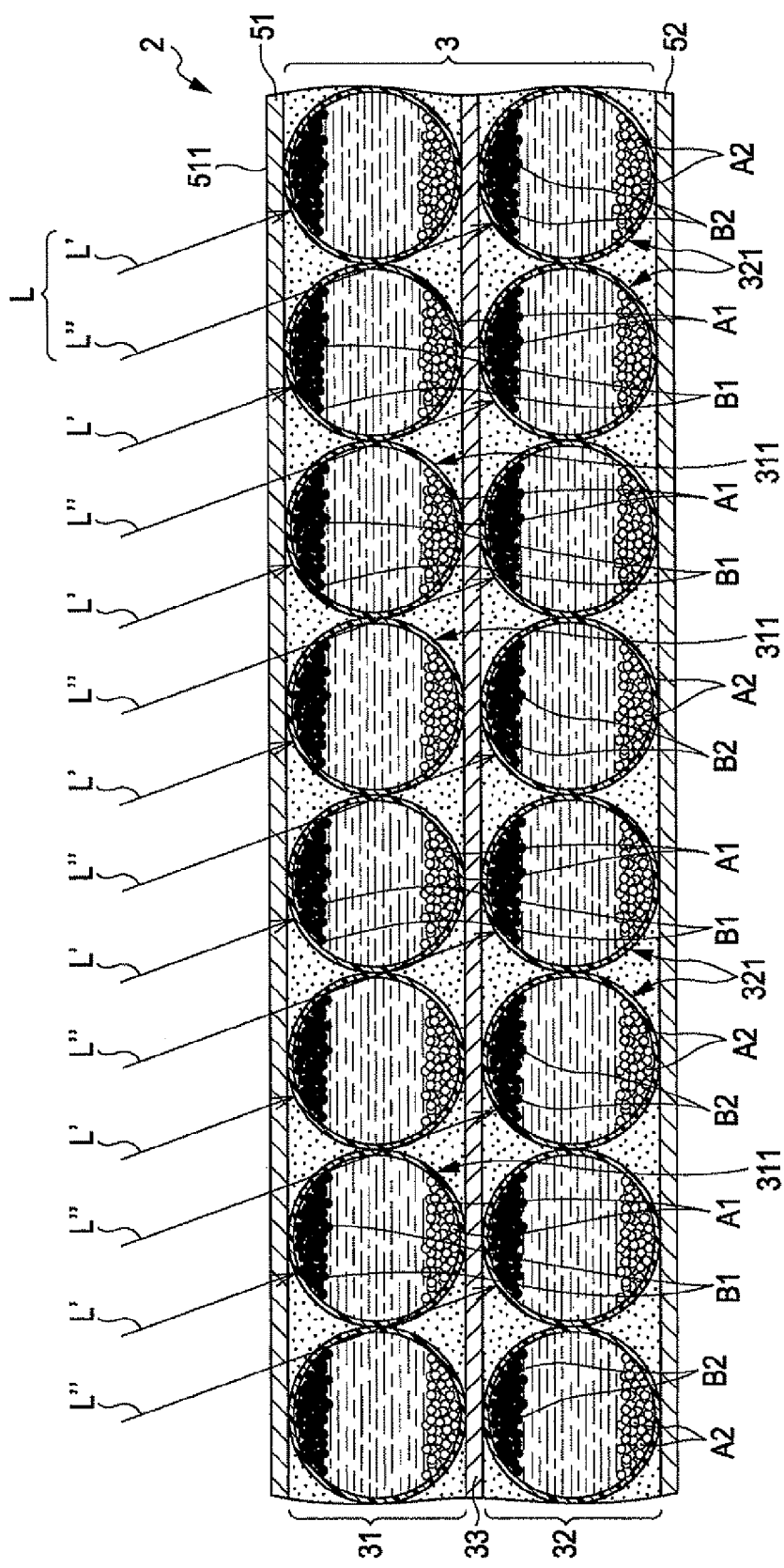
FIG. 8 is a cross-sectional view illustrating paths of light beams incident on the display sheet.

FIG. 1 is a perspective view schematically illustrating the first embodiment of the display device of the invention; FIG. 2 is a cross-sectional view of a display sheet fitted to the display device shown in FIG. 1; FIGS. 3 to 5 are each a cross-sectional view illustrating an action of the display device shown in FIG. 1; FIG. 6 is a diagram showing a display sheet on which a desired image is written; and FIGS. 7 and 8 are each a cross-sectional view illustrating paths of light beams incident on the display sheet. Note that, hereinafter, the upper sides in FIGS. 2 to 5, 7, and 8 are referred to as "upper", and the lower sides are referred to as "lower", for convenience of explanation. Furthermore, as shown in FIG. 2, three axes that are perpendicularly intersecting to one another are defined as an x-axis, a y-axis, and a z-axis; the xy-plane corresponds to the display surface of a display sheet; and the z-axis corresponds to a normal line of the display surface of the display sheet (the same is applied to other drawings). Furthermore, in FIGS. 3 to 5, 7, and 8, liquid phase dispersion media are omitted in the drawings (the same is also applied to FIGS. 9, 11 to 15, and 17 to 19) for convenience of explanation.

The display device (electrophoretic display device) 1 shown in FIG. 1 includes a display sheet 2 and a writing device 8. This display device 1 is used for writing a desired character or drawing with a writing pen 84 of the writing device 8 on the display sheet 2. By thus constituting the display device 1, the display sheet 2 can be used as a rewritable paper, and, therefore, the convenience of the display device 1 is improved.

The structures of the display sheet 2 and the writing device 8 will be described in detail in order below.

Display Sheet 2

The display sheet 2 is an electrophoretic display sheet where an image is displayed by utilizing electrophoresis of electrophoretic particles.

As shown in FIG. 2, the display sheet 2 is composed of a display layer 3 and protective sheets (protective films) 51 and 52 disposed on both surfaces of the display layer 3. In this display sheet 2, the upper surface of the protective sheet 51 constitutes a display surface 511, and a predetermined image can be recognized by visually recognizing the display layer 3 through the display surface 511.

As shown in FIG. 2, the display layer 3 is composed of a first display layer 31, a second display layer 32, and an intermediate layer 33 disposed therebetween.

The first display layer 31 is composed of multiple first microcapsules (first containers) 311 and a binder 312 fixing (holding) the first microcapsules 311. Furthermore, the multiple first microcapsules 311 are arranged parallel in the longitudinal and transverse directions between the protective sheet 51 and the intermediate layer 33 to form a single layer (one by one without overlapping in the thickness direction).

The second display layer 32 is disposed on the lower side (protective sheet 52 side) of the first display layer 31. This second display layer 32 has a structure similar to that of the first display layer 31. That is, the second display layer 32 is composed of multiple second microcapsules (second containers) 321 and a binder 322 fixing (holding) the second microcapsules 321. Furthermore, the multiple second microcapsules 321 are arranged parallel in the longitudinal and transverse directions between the intermediate layer 33 and the protective sheet 52 to form a single layer (one by one without overlapping in the thickness direction).

By thus constituting the first containers 311 and the second containers 321 with microcapsules, the structure of the display sheet 2 is simplified. Furthermore, the first display layer 31 and the second display layer 32 are provided with elasticity to a certain extent and thereby can effectively release or absorb external force, such as pressing force, applied to the first and the second display layers 31 and 32. In addition, the first and the second display layers 31 and 32 are provided with excellent flexibility and thereby can make the display sheet 2 flexible.

The first microcapsules 311 each include a spherical capsule body (shell) 311a, and the inside (inner space) of the capsule body 311a is filled with an electrophoretic dispersion liquid. Similarly, the second microcapsules 321 each include a spherical capsule body 321a, and the inside (inner space) of the capsule body 321a is filled with an electrophoretic dispersion liquid. By thus making the first and the second microcapsules 311 and 321 spherical, these microcapsules can be provided with excellent pressure resistance and bleed resistance. Therefore, as described below, even if external force (pressing force) of a certain level is applied to the first and the second microcapsules 311 and 321 by pressing the display surface 511 with the writing pen 84, the first and the second microcapsules 311 and 321 can release or absorb the external force and are prevented from being broken.

As shown in FIG. 2, in this embodiment, the average particle diameter of the first microcapsules 311 (average of maximum widths of the first microcapsules 311 in the xy-planar view) and the average particle diameter of the second microcapsules 321 (average of maximum widths of the second microcapsules 321 in the xy-planar view) are determined so as to be approximately equal to each other. By doing so, since the microcapsules used as the first microcapsules 311 and the microcapsules used as the second microcapsules 321 are the same, that is, microcapsules having a certain particle diameter can be used as the first microcapsules 311 and also as the second microcapsules 321, the device configuration of the display sheet 2 can be simplified, and also the steps of producing the display sheet 2 can be simplified.

Furthermore, as shown in FIG. 2, each first microcapsule 311 and the corresponding second microcapsule 321 positioned beneath the first microcapsule overlap in the thickness direction (z-axis direction) of the display sheet without shifting from each other in the horizontal direction (x-axis direction) in the plane of the paper or in the depth direction (y-axis direction) in the plane of the paper. In other words, the first microcapsules 311 and the second microcapsules 321 are arranged in such a manner that one first microcapsule 311 contains one second microcapsule 321 in a planar view of the display surface 511.

The particle diameters (average particle diameters) of the first and the second microcapsules 311 and 321 are not particularly limited, but are preferably about from 10 to 200 μm from the viewpoints of resolution and the covering ratio.

The constituent materials of the capsule bodies 311a and 321a are particularly limited, and examples thereof include gelatin, composite materials of gum arabic and gelatin, urethane-based resins, melamine-based resins, urea resins, epoxy-based resins, phenol-based resins, acrylic resins, olefin-based resins, and various resin materials such as polyamides and polyethers, which may be used alone or in combination of two or more.

The electrophoretic dispersion liquid contained in the capsule body 311a is a dispersion (suspension) liquid where a first electrophoretic particle group composed of positively-charged particles A1 (first positively-charged particles) that are positively charged and negatively-charged particles B1 (first negatively-charged particles) that are negatively charged and have a color different from that of the positively-charged particles A1 is dispersed (suspended) in a liquid phase dispersion medium 61. On the other hand, the electrophoretic dispersion liquid contained in the capsule body 321a is a dispersion (suspension) liquid where a second electrophoretic particle group composed of positively-charged particles A2 (second positively-charged particles) that are positively charged and have the same color as that of the positively-charged particles A1 and negatively-charged particles B2 (second negatively-charged particles) that are negatively charged and have the same color as that of the negatively-charged particles B1 is dispersed (suspended) in a liquid phase dispersion medium 62.

In this embodiment, the positively-charged particles A1 and A2 have structures similar to each other, and the negatively-charged particles B1 and B2 have structures similar to each other. The dispersion of the positively-charged particles A1 and the negatively-charged particles B1 in the liquid phase dispersion medium 61 and the dispersion of the positively-charged particles A2 and the negatively-charged particles B2 in the liquid phase dispersion medium 62 can be performed by, for example, paint shaking, ball milling, media milling, ultrasonic dispersion, stirring dispersion, or a combination of two or more thereof.

As the liquid phase dispersion media 61 and 62, for example, aromatic hydrocarbons such as benzene hydrocarbons, paraffin hydrocarbons such as n-hexane and n-decane, isoparaffin hydrocarbons such as Isopar (Exxon Chemical Co.), olefin hydrocarbons such as 1-octene and 1-decene, aliphatic hydrocarbons such as naphthene hydrocarbons, petroleum such as kerosene, petroleum ether, petroleum benzine, ligroin, industrial petroleum, and petroleum naphtha and hydrocarbon mixtures derived from petroleum, halogenated hydrocarbons such as dichloromethane and chloroform, silicone oils (organic silicone oils) such as dimethyl silicone oil and methylphenyl silicone oil, and fluorine-based solvents such as hydrofluoroether are preferably used. Among these media, organic silicone oils can be easily adjusted in their viscosities and therefore more preferably used.

The positively-charged particles A1 and A2 are white electrophoretic particles that are positively charged, and the negatively-charged particles B1 and B2 are black electrophoretic particles that are negatively charged. Thus, the first and the second microcapsules 311 and 321 each contain both white and black electrophoretic particles and thereby enable the display sheet 2 to display black-and-white images and improve display contrast of the display sheet 2.

In this embodiment, white particles are used as the positively-charged particles A1, and black particles are used as the negatively-charged particles B1, but the colors of the positively-charged particles A1 and the negatively-charged particles B1 are not specifically limited as long as they are different from each other. For example, they can be each suitably selected according to purposes from chromatic colors such as red, blue, and green and metallic glossy colors such as gold and silver. In addition, the combination of colors of the positively-charged particles A1 and the negatively-charged particles B1 is not limited to the above, for example, a combination of positively-charged black particles A1 and negatively-charged white particles B1, a combination of positively-charged blue particles A1 and negatively-charged red particles B1, or a combination of positively-charged gold particles A1 and negatively-charged silver particles B1 may be employed. The above is also similarly applied to the positively-charged particles A2 and the negatively-charged particles B2.

The positively-charged particles A1 and A2 and the negatively-charged particles B1 and B2 are not particularly limited and may be any particles that have charges, but at least one selected from pigment particles, resin particles, and their composite particles are preferably used. These particles have advantages that they can be easily produced and that the charge amount can be relatively easily controlled.

Examples of the pigment constituting the pigment particles include black pigments such as aniline black, carbon black, and titanium black, white pigments such as titanium oxide and antimony oxide, azo-based pigments such as monoazo, yellow pigments such as isoindolinone and chrome yellow, red pigments such as quinacridone red and chrome vermilion, blue pigments such as phthalocyanine blue and indanthrene blue, and green pigments such as phthalocyanine green. These may be used alone or in combination of two or more.

As pigment particles, titanium oxide particles are preferably used as the white particles (positively-charged particles A1 and A2 in this embodiment), and titanium black particles are preferably used as the black particles (negatively-charged particles B1 and B2 in this embodiment). These particles have high electric field-responsiveness, and the difference in reflectance is large. Therefore, the display sheet 2 can display images with high contrast.

Examples of the resin material constituting the resin particles include acrylic resins, urethane-based resins, urea resins, epoxy-based resins, polystyrene, and polyester, which may be used alone or in combination of two or more.

Examples of the composite particles include pigment particles having surfaces covered with a resin material or another pigment, resin particles having surfaces covered with a pigment, and particles made of a mixture of a pigment and a resin material at an arbitrary composition ratio.

Examples of the pigment particles having surfaces covered with another pigment include titanium oxide particles having surfaces covered with silicon oxide or aluminum oxide.

The shapes of the positively-charged particles A1 and A2 and the negatively-charged particles B1 and B2 are not particularly limited, but are preferably spherical.

The positively-charged particles A1 and A2 and the negatively-charged particles B1 and B2 preferably have smaller sizes in light of dispersibility in the liquid phase dispersion medium 61 or 62. Specifically, the average particle diameter is preferably about from 0.1 to 10 μm and more preferably about from 0.1 to 7.5 μm. Aggregation of the positively-charged particles A1 and the negatively-charged particles B1 and sedimentation of the positively-charged particles A1 and the negatively-charged particles B1 can be prevented by adjusting the average particle diameters of the positively-charged particles A1 and the negatively-charged particles B1 to the above-mentioned range, and, thereby, the state where the positively-charged particles A1 and the negatively-charged particles B1 are dispersed in the liquid phase dispersion medium 61 can be maintained. Similarly, aggregation of the positively-charged particles A2 and the negatively-charged particles 32 and sedimentation of the positively-charged particles A2 and the negatively-charged particles 32 can be prevented by adjusting the average particle diameters of the positively-charged particles A2 and the negatively-charged particles B2, and, thereby, the state where the positively-charged particles A2 and the negatively-charged particles B2 are dispersed in the liquid phase dispersion medium 62 can be maintained. As a result, the deterioration of display quality of the display device 1 (display sheet 2) can be suitably prevented.

Furthermore, when two different types of particles (positively-charged particles A1 and negatively-charged particles B1) are used as the first electrophoretic particle group, as in this embodiment, it is preferable that the average particle diameters of the two types of particles be different from each other, in particular, the average particle diameter of the positively-charged white particles A1 is larger than the average particle diameter of the negatively-charged black particles B1. This is similarly applied to the second electrophoretic particle group (positively-charged particles A2 and negatively-charged particles B2). By doing so, the display contrast of the display device 1 can be further improved, and the retention characteristic can be improved.

In addition, the specific gravities of the positively-charged particles A1 and the negatively-charged particles B1 are preferably adjusted to be approximately equal to that of the liquid phase dispersion medium 61. By doing so, the positions of the positively-charged particles A1 and the negatively-charged particles B1 in the liquid phase dispersion medium 61 can be maintained for a long time even after termination of the action of the electric field described below. Similarly, the specific gravities of the positively-charged particles A2 and the negatively-charged particles B2 are preferably adjusted to be approximately equal to that of the liquid phase dispersion medium 62. By doing so, the positions of the positively-charged particles A2 and the negatively-charged particles B2 in the liquid phase dispersion medium 62 can be maintained for a long time even after termination of the action of the electric field described below.

The binder 312 is provided for the purposes of, for example, bonding the protective sheet 51 and the intermediate layer 33 to the first display layer 31 and fixing the first microcapsules 311 between the protective sheet 51 and the intermediate layer 33. Similarly, the binder 322 is provided for the purposes of, for example, bonding the protective sheet 52 and the intermediate layer 33 to the second display layer 32 and fixing the second microcapsules 321 between the protective sheet 52 and the intermediate layer 33. By doing so, the durability and the reliability of the display sheet 2 can be improved.

The binder 312 is preferably a resin material that is excellent in affinity (adhesion) for the protective sheet 51, the intermediate layer 33, and the capsule body 311$a$ and also excellent in electric insulation. Similarly, the binder 322 is preferably a resin material that is excellent in affinity (adhesion) for the protective sheet 52, the intermediate layer 33, and the capsule body 321$a$ and also excellent in electric insulation. Examples of the binders 312 and 322 include various resin materials such as polyacrylonitriles, polyethylenes, polypropylene, polyethylene terephthalates, polycarbonates, Nylon 66, urethane-based resins such as polyurethanes, epoxides, polyimides, ABS resins, polyvinyl acetate, methacrylic acid ester resins such as methyl polymethacrylate, ethyl polymethacrylate, butyl polymethacrylate, and octyl polymethacrylate, vinyl chloride resins, cellulose-based resins, silicone-based resins, and ethylene-vinyl acetate copolymers, which may be used alone or in combination of two or more.

The intermediate layer 33 disposed between the first display layer 31 and the second display layer 32 is made of a sheet-like member (film-like member). The intermediate layer 33 has a function, for example, partitioning between the first display layer 31 and the second display layer 32. The intermediate layer 33 having such a function can prevent the first microcapsules 311 from penetrating into the second display layer 32 and, conversely, can prevent the second microcapsules 321 from penetrating into the first display layer 31.

The intermediate layer 33 has light permeability so that the light beams entering from the display surface 511 can penetrate into the second display layer 32, that is, the intermediate layer 33 is substantially transparent (colorless transparent, colored transparent, or semi-transparent).

The intermediate layer 33 is electrically conductive in the thickness direction (z-axis direction) of the intermediate layer 33 and is electrically non-conductive in the lateral direction (x-axis direction, y-axis direction, the combined direction of x-axis and y-axis). By doing so, as described below, when an electric field in the z-axis direction is partially applied to the display layer 3, a current can flow in the thickness direction and can be prevented or inhibited from flowing to the lateral direction. Therefore, actions of the first microcapsules 311 and the second microcapsules 321 can be controlled in a narrower region of the display layer 3 in a planar view of the display sheet 2. As a result, it is possible to display a finer and clearer image at a high resolution, which improves the display characteristics of the display device.

This intermediate layer 33 is made of a constituent material having high electric insulation. By thus making the intermediate layer 33 by a constituent material having high electric insulation (low electric conductivity), the intermediate layer 33 having the above-described characteristics (that is, electrically conductive in the thickness direction, and electrically non-conductive in the lateral direction) can be easily obtained. Specifically, since the intermediate layer 33 is sheet-like, the thickness is relatively small. Therefore, the intermediate layer 33 being electrically conductive in the thickness direction and electrically non-conductive in the lateral direction can be obtained by forming the intermediate layer 33 using a material having high electric insulation.

The thickness of the intermediate layer 33 is not particularly limited and is preferably from 0.1 to 40 μm, though it varies depending on the conductivity of the intermediate layer 33 and so on. By doing so, the intermediate layer 33 being electrically conductive in the thickness direction can be obtained without reducing the mechanical strength.

The conductivity of the intermediate layer 33 (dielectric constant of the constituent material of the intermediate layer 33) is not particularly limited, but is preferably equal to or less than the conductivity of the binder 312. Specifically, the conductivity of the intermediate layer 33 is preferably from 1 Ωcm to 1 GΩcm, more preferably from 1 kΩcm to 100 MΩcm, in the thickness direction. Within such a level range, the intermediate layer 33 being electrically conductive in the thickness direction and electrically non-conductive in the lateral direction can be more surely obtained.

Examples of the constituent material of the intermediate layer 33 include polyolefins such as polyethylene, modified polyolefins, polyamides, thermoplastic polyimides, polyethers, polyether ether ketones, various thermoplastic elastomers such as polyurethane-based and polyethylene chloride-based elastomers, and their copolymers, blends, and polymer alloys containing them as main ingredients, which may be used alone or in combination of two or more.

The protective sheets 51 and 52 oppositely arranged with the above-described display layer 3 therebetween are each made of a sheet-like member having high electric insulation. The pair of protective sheets 51 and 52 has a function of protecting the display layer 3. Incidentally, the protective sheets 51 and 52 can be omitted according to need.

The protective sheet 51 has light permeability for constituting the display surface 511, that is, the protective sheet 51 is substantially transparent (colorless transparent, colored transparent, or semi-transparent). By doing so, the state of the display layer 3, namely, an image (information) displayed on the display sheet 2, can be visually recognized from the display surface 511 side.

On the other hand, the protective sheet 52 is not required to be light permeable, unlike the protective sheet 51. When the protective sheet 52 has light permeability, an image (negative image), which is an image that the black and white colors of the image displayed on the display surface 511 are reversed, is displayed on the bottom surface of the protective sheet 52.

The protective sheets 51 and 52 may be flexible or stiff, but is preferably flexible. The protective sheets 51 and 52 having flexibility can make the display sheet 2 flexible. By doing so, the convenience of the display sheet 2 is improved.

When the protective sheets 51 and 52 are flexible, examples of the constituent materials thereof include polyolefins such as polyethylene, modified polyolefins, polyamides, thermoplastic polyimides, polyethers, polyether ether ketones, various thermoplastic elastomers such as polyurethane-based and polyethylene chloride-based elastomers, and their copolymers, blends, and polymer alloys containing them as main ingredients, which may be used alone or in combination of two or more.

Writing Device 8

The writing device 8 is used for writing a desired image (pattern, color, character, or combination thereof) on the display sheet 2. After the completion of the writing of the image on the display sheet 2, the writing device 8 can be detached from the display sheet 2.

As shown in FIG. 1, the writing device 8 includes a pedestal 81, a sheet-like (plate-like) common electrode 82 disposed on the pedestal 81, a writing pen (input tool) 84 provided with a partial electrode 83 at its tip, and a voltage-applying means (electric field-generating means) 85 that applies a voltage between the common electrode 82 and the partial electrode 83.

The common electrode 82 also functions as a holding portion for holding the display sheet 2, and writing of an image on the display sheet 2 is performed at the state that the display sheet 2 is placed on the common electrode 82. Therefore, the common electrode 82 is formed so as to contain the display sheet 2 when the display sheet 2 is placed on the common electrode 82. The shape of the common electrode 82 in a planar view in this embodiment is similar to and slightly larger than the shape of the display sheet 2 in a planar view.

As described above, since the display sheet 2 is placed on the common electrode 82 when an image is written on the display sheet 2 and is removed from the common electrode 82 after the completion of writing (that is, except when writing is being conducted), the display sheet 2 and the common electrode 82 can be separated. That is, the display sheet 2 is detachable from the common electrode 82. Since the common electrode 82 does not have particular roles except when writing to the display sheet 2 is being conducted, the display sheet 2 can be reduced in the size and weight by making the common electrode 82 detachable from the display sheet 2, which improves the convenience of the display device 1.

The writing pen 84 is made of, for example, a plastic material having electric insulation and is used in such a manner that a user holds the writing pen 84 with the hand and traces the display surface 511 of the display sheet 2. The writing pen 84 is provided with the partial electrode 83 at its tip. In addition, the writing pen 84 is provided with a button 841 on its tip side. The conduction between the voltage-applying means 85 and the partial electrode 83 is turned on or off by operating the button 841.

The partial electrode 83 is provided to the writing pen 84 and is therefore movable with respect to the display sheet 2. Thus, it is possible to write a desired character and the like on the display surface 511 of the display sheet 2 by the partial electrode 83 provided to the tip of the pen-like input tool just like drawing the character and the like on paper with a pencil. Therefore, the operability (usability) of the display device is improved.

The partial electrode 83 has an area (area in a planar view) that is sufficiently smaller than the area of the display surface 511 of the display sheet 2. Therefore, by using the writing device 8, a voltage can be partially applied to the display layer 3 between the common electrode 82 and the partial electrode 83, and, as described below, a user can write (draw) an image on the display sheet 2 at will.

The area (area in a planar view) of the partial electrode 83 is not particularly limited and can be set according to the purpose. A smaller area of the partial electrode 83 makes it possible to draw finer lines and to therefore draw finer images.

The constituent materials of the common electrode 82 and the partial electrode 83 are not particularly limited as long as they are substantially electrically conductive, and examples thereof include various electrically conductive materials, for example, metallic materials such as copper, aluminum, and their alloys, carbon materials such as carbon black, electron-conducting polymers such as polyacethylene, polyfluorene, and their derivatives, ion-conducting polymers in which ionic materials such as NaCl and $Cu(CF_3SO_3)_2$ are dispersed in matrix resins such as polyvinyl alcohol and polycarbonate, and electrically conductive oxides such as indium oxide (IO), which may be used alone or in combination of two or more.

Action of Display Device 1 (Display Sheet 2)

Next, based on FIGS. 3 and 4, the action of the display sheet 2 (switching of display color) will be described. Note that a pair of the first microcapsule 311 and the second microcapsule 321 that constitute a minimum unit pixel will be representatively described below, and the descriptions of other microcapsules (pixel units) are omitted. FIGS. 3 and 4 each show the state that the display sheet 2 is placed on the pedestal 81 (common electrode 82) in such a manner that the protective sheet 52 faces the common electrode 82 and that the partial electrode 83 provided at the tip of the writing pen 84 is in contact with the display surface 511 of the display sheet 2.

White-Displaying State

First, a state that white is displayed on the display surface 511 will be described.

A first voltage is applied between the pair of electrodes 82 and 83 with the voltage-applying means 85 to generate an electric field in such a manner that the common electrode 82 side is at positive potential and the partial electrode 83 side is at negative potential. This electric field acts on the first microcapsule 311, so that the positively-charged particles A1 therein migrate toward the partial electrode 83 side at the negative potential and that the negatively-charged particles B1 migrate toward the common electrode 82 side at the positive potential. In addition, the electric field acts on the second microcapsule 321, so that the positively-charged particles A2 migrate toward the partial electrode 83 side as in the positively-charged particles A1 and that the negatively-charged particles B2 migrate toward the common electrode 82 side as in the negatively-charged particles B1.

By such migration of the positively-charged particles A1 and A2 and the negatively-charged particles B1 and B2, as shown in FIG. 3, the positively-charged particles A1 are gathered on the partial electrode 83 side and the negatively-charged particles B1 are gathered on the common electrode 82 side in the first microcapsule 311; and the positively-charged particles A2 are gathered on the partial electrode 83 side and the negatively-charged particles B2 are gathered on the common electrode 82 side in the second microcapsule 321. With this, the white-displaying state where white is displayed on the display surface 511 is formed.

Black-Displaying State

Then, a state that black is displayed on the display surface 511 will be described.

A second voltage is applied between the pair of electrodes 82 and 83 by the voltage-applying means 85 to generate an electric field in such a manner that the common electrode 82 side is at negative potential and the partial electrode 83 side is at positive potential. This electric field acts on the first microcapsule 311, so that the negatively-charged particles B1 migrate toward the partial electrode 83 side at the positive potential and that the positively-charged particles A1 migrate toward the common electrode 82 side at the negative potential. In addition, the electric field acts on the second microcapsule 321, so that the negatively-charged particles B2 migrate toward the partial electrode 83 side as in the negatively-charged particles B1 and that the positively-charged particles A2 migrate toward the common electrode 82 side as in the positively-charged particles A1.

By such migration of the positively-charged particles A1 and A2 and the negatively-charged particles B1 and B2, as shown in FIG. 4, the negatively-charged particles B1 are gathered on the partial electrode 83 side and the positively-charged particles A1 are gathered on the common electrode 82 side in the first microcapsule 311; and the negatively-charged particles B2 are gathered on the partial electrode 83 side and the positively-charged particles A2 are gathered on the common electrode 82 side in the second microcapsule 321. With this, the black-displaying state where black is displayed on the display surface 511 is formed.

The white-displaying state and the black-displaying state have been described above. As obvious from the descriptions, by applying a predetermined voltage between the electrodes 82 and 83, both the positively-charged particles A1 and A2 migrate toward the partial electrode 83 side (or the common electrode 82 side), and, simultaneously, both the negatively-charged particles B1 and B2 migrate toward the common electrode 82 side (or the partial electrode 83 side). That is, the first electrophoretic particle group and the second electrophoretic particle group show similar behavior.

In this specification, the term "similar behavior" means that when the positively-charged particles A1 migrate or are migrating toward the partial electrode 83 side, the positively-charged particles A2 also migrate or are migrating toward the partial electrode 83 side; and when the negatively-charged particles B1 migrate or are migrating toward the common electrode 82 side, the negatively-charged particles B2 also migrate or are migrating toward the common electrode 82 side, and means that, conversely, when the positively-charged particles A1 migrate or are migrating toward the common electrode 82 side, the positively-charged particles A2 also migrate or are migrating toward the common electrode 82 side; and when the negatively-charged particles B1 migrate or are migrating toward the partial electrode 83 side, the negatively-charged particles B2 also migrate or are migrating toward the partial electrode 83. Therefore, the mobilities (electrophoretic velocities) of the positively-charged particles A1 and A2 may be the same or different, and also the mobilities of the negatively-charged particles B1 and B2 may be the same or different.

The term "are migrating" covers the cases, for example, as the third, sixth, and seventh embodiments described below, that though the positively-charged particles A2 are still under migration, the positively-charged particles A1 have completed the migration and cannot substantially migrate any more, and that, conversely, though the positively-charged particles A2 have completed the migration and cannot substantially migrate any more, the positively-charged particles A1 are still under migration, when the particle diameter of the first microcapsules 311 is different from that of the second microcapsules 321 or when the mobility of the positively-charged particles A1 is different from that of the positively-charged particles A2.

Furthermore, the term "similar behavior" also means that as long as the positively-charged particles A1 and A2 (the same is applied to the negatively-charged particles B1 and B2) migrate to the same side when viewed in the thickness direction of the display layer 3, the migration directions (slanting angle with respect to the thickness direction) may be different from each other. Specifically, the term "similar behavior" covers the cases, for example, that though the positively-charged particles A1 migrate toward the partial electrode 83 side along the thickness direction of the display layer 3, the positively-charged particles A2 migrate toward the partial electrode 83 side along a direction slanting with respect to the thickness direction of the display layer 3 at an angle of less than 90° and that though the positively-charged particles A1 and A2 migrate toward the partial electrode 83 side along a direction slanting with respect to the thickness direction of the display layer 3, the slanting angles thereof are different from each other.

These cases are included from the following reasons.

FIG. 5 diagrammatically shows the first microcapsule 311 (311') and the second microcapsule 321 (321') sandwiched between the electrodes 82 and 83, and the first microcapsules 311 (311") and the second microcapsules 321 (321") not sandwiched between the electrodes 82 and 83.

For example, an electric field E is generated by applying the first voltage (a voltage that the partial electrode 83 is at negative potential and the common electrode 82 is at positive potential) between the electrodes 82 and 83. Since the area (area in a planar view) of the partial electrode 83 is smaller than that of the common electrode 82, the electric field E is generated so as to spread from the partial electrode 83 to the common electrode 82. Therefore, the first microcapsule 311' and the second microcapsule 321' sandwiched between the electrodes 82 and 83 are applied with an electric field E' in a direction that is approximately the same as the thickness direction of the display layer 3, whereas the first microcapsules 311" and the second microcapsules 321" are applied with an electric field E" in a direction that slants from the thickness direction of the display layer 3.

In the first and the second microcapsules 311' and 321' to which the electric field E' is applied, the electric field E' acts on them in the same direction (the thickness direction of the display layer 3). Therefore, in the first and the second microcapsules 311' and 321', both the positively-charged particles A1 and A2 migrate toward the partial electrode 83 side along the thickness direction of the display layer 3, and both the negatively-charged particles B1 and B2 migrate toward the common electrode 82 side along the thickness direction of the display layer 3. That is, the migration directions of the positively-charged particles A1 and A2 are the same as each other, and the migration directions of the negatively-charged particles B1 and B2 are the same as each other.

On the other hand, in the first and the second microcapsules 311" and 321" to which the electric field E" is applied, the electric field acting on the first microcapsules 311" slants larger than the electric field acting on the second microcapsules 321" positioned beneath the first microcapsules 311" in the thickness direction of the display layer 3. Therefore, in the first and the second microcapsules 311" and 321", both the positively-charged particles A1 and A2 migrate toward the partial electrode 83 side, but their migration directions (slanting angle from the thickness direction of the display layer 3) are different from each other, and, similarly, both the negatively-charged particles B1 and B2 migrate toward the common electrode 82 side, but their migration directions are different from each other.

Thus, in view of the difference in the migration directions of the positively-charged particles A1 and A2 (negatively-charged particles B1 and B2) due to the electric field directions, the term "similar behavior" includes the cases where, as long as the positively-charged particles A1 and A2 (negatively-charged particles B1 and B2) migrate toward the same side when viewed from the thickness direction of the display layer 3, a difference in the migration directions (slanting angles in the thickness direction) is allowed.

In such a configuration, desired information (image) can be displayed on the display surface 511 of the display sheet 2 based on light reflected by the positively-charged particles A1 and A2 and the negatively-charged particles B1 and B2 by selecting migration of the positively-charged particles A1 and A2 and the negatively-charged particles B1 and B2 for every minimum unit pixel (a pair of one first microcapsule 311 and its corresponding second microcapsule 321).

For example, the above-described white-displaying state is formed in the entire region of the display surface 511, and then the writing pen 84 is moved so as to trace the display surface 511 of the display sheet 2 while the second voltage is applied between the pair of the electrodes 82 and 83, thereby switching the minimum unit pixels positioned on the course of the writing pen 84 to the black-displaying state. As a result, a black line corresponding to the course of the writing pen 84 is drawn on the display surface 511. With this, for example, an image as shown in FIG. 6 can be drawn. As described above, the states of the positively-charged particles A1 and the negatively-charged particles B1 can be maintained in each first microcapsule 311 of the display sheet 2 for a long time even after the termination of the action of the electric field (which is the same in each second microcapsule 321), and it is therefore possible to write an image as described above.

Furthermore, for example, when points and lines that start from different points on the display surface 511 are drawn as in characters having two or more starting points, such as "X" and "Y", it is preferable that the conduction between the voltage-applying means 85 and the partial electrode 83 be turned off by operating the button 841 during the period of moving the writing pen 84 from the end point of an arbitrary line to the starting point of the next line. By doing so, undesirable writing on the display sheet 2 can be effectively prevented.

Here, the first electrophoretic particle group contained in the first microcapsules 311 and the second electrophoretic particle group contained in the second microcapsules 321 are each composed of positively-charged white particles and negatively-charged black particles. Therefore, when a predetermined voltage is applied by the writing device 8 to the entire region or a partial region of the display sheet 2, similar images are displayed on both the upper surface (the surface on the display surface 511 side) of the first display layer 31 and the upper surface of the second display layer 32. As a result, a clearer image is displayed on the display surface 511, which improves the display characteristics of the display sheet 2.

FIG. 7 is a cross-sectional view of the display sheet 2 where at least a part of the display surface 511 is in the white-displaying state. As shown in FIG. 7, when light beams L enter the display layer 3 through the display surface 511, a light beam L' among the light beams L is reflected by the positively-charged particles A1 in the first microcapsule 311 contained in the first display layer 31, and a light beam L" that passes through the first display layer 31 without being reflected by the positively-charged particles A1 is reflected by the positively-charged particles A2 in the second microcapsule 321 contained in the second display layer 32. That is, almost all the incident light beams L can be reflected by either the positively-charged particles A1 or A2.

FIG. 8 is a cross-sectional view of the display sheet 2 where at least a part of the display surface 511 is in the black-displaying state. As shown in FIG. 8, when light beams L enter the display layer 3 through the display surface 511, a light beam L' among the light beams L is absorbed by the negatively-charged particles 31 in the first microcapsule 311 contained in the first display layer 31, and a light beam L" that passes through the first display layer 31 without being absorbed by the negatively-charged particles B1 is absorbed by the negatively-charged particles B2 in the second microcapsule 321 contained in the second display layer 32. That is, almost all the incident light beams L can be absorbed by either the negatively-charged particles B1 or B2.

Therefore, in such a display sheet 2, the light beams incident on the display layer 3 can be efficiently used, resulting in an increase in the brightness of images displayed on the display surface 511 and an increase in display contrast.

Second Embodiment

Next, a second embodiment of the display device (display device of the invention) to which the display sheet of the invention is applied will be described.

Figure 9:
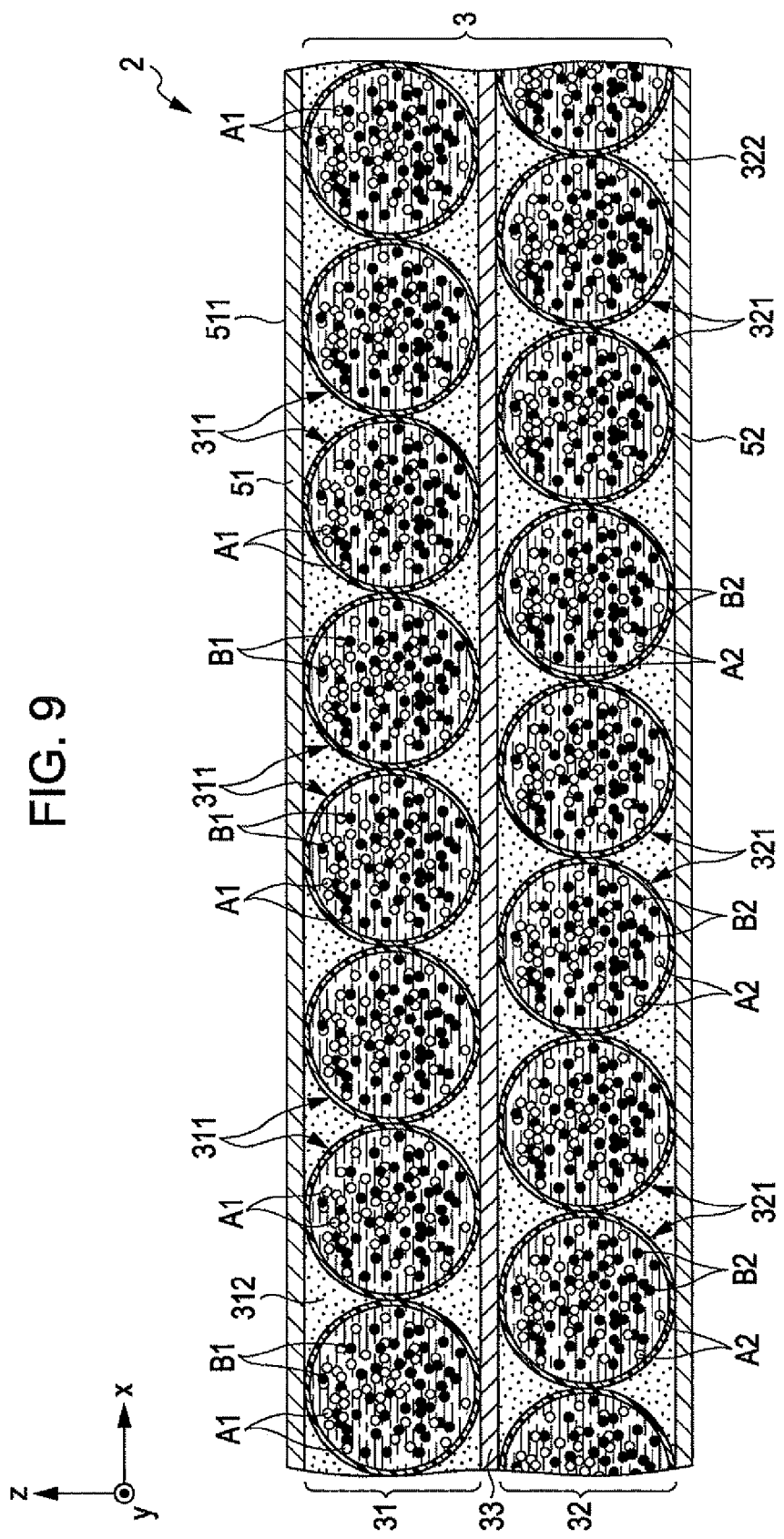
FIG. 9 is a cross-sectional view of the display sheet applied to the display device of the invention according to a second embodiment.
Figure 10:
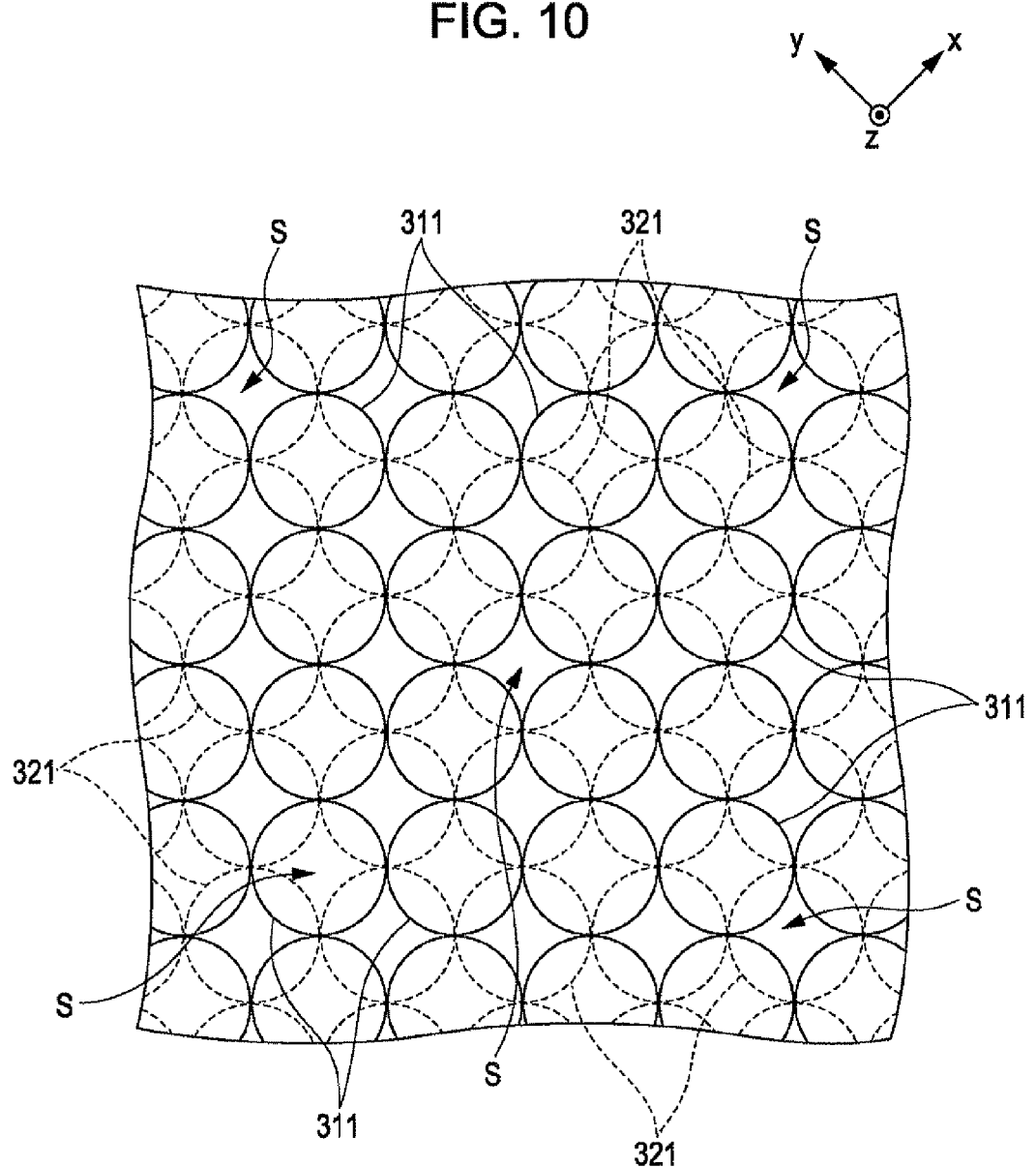
FIG. 10 is a top view of the display sheet shown in FIG. 9.

FIG. 9 is a cross-sectional view of the display sheet applied to the display device of the invention according to the second embodiment; FIG. 10 is a top view of the display sheet shown in FIG. 9; and FIGS. 11 to 14 are each a cross-sectional view illustrating paths of light beams incident on the display sheet. Note that, hereinafter, the upper sides in FIGS. 9 and 11 to 14 are referred to as "upper", and the lower sides are referred to as "lower", for convenience of explanation. Furthermore, as shown in FIG. 9, three axes that are perpendicularly intersecting to one another are defined as an x-axis, a y-axis, and a z-axis; the xy-plane corresponds to the display surface of a display sheet; and the z-axis corresponds to a normal line of the display surface of the display sheet (the same is applied to other drawings).

The display device according to the second embodiment will be described below, but the differences from the first embodiment will be mainly described, and descriptions on similar matters will be omitted.

The display device according to this embodiment has the same structure as that of the first embodiment except that the structure of the display layer 3 of the display sheet 2 is different.

As shown in FIGS. 9 and 10, in the display layer 3 of this embodiment, the second microcapsules 321 are arranged so as to be shifted in the x-axis direction and the y-axis direction relative to the first microcapsules 311 respectively positioned above the second microcapsules 321. In particular, in this embodiment, each second microcapsule 321 is shifted in the x-axis direction and the y-axis direction by a half distance of the average particle diameter of the first microcapsules 311 (second microcapsules 321) relative to the first microcapsule 311 positioned above the second microcapsule 321. In other words, as shown in FIG. 10, each second microcapsule 321 is disposed so as to fill the gap S formed by four adjacent first microcapsules 311 in a planar view (xy-planar view).

Figure 11:
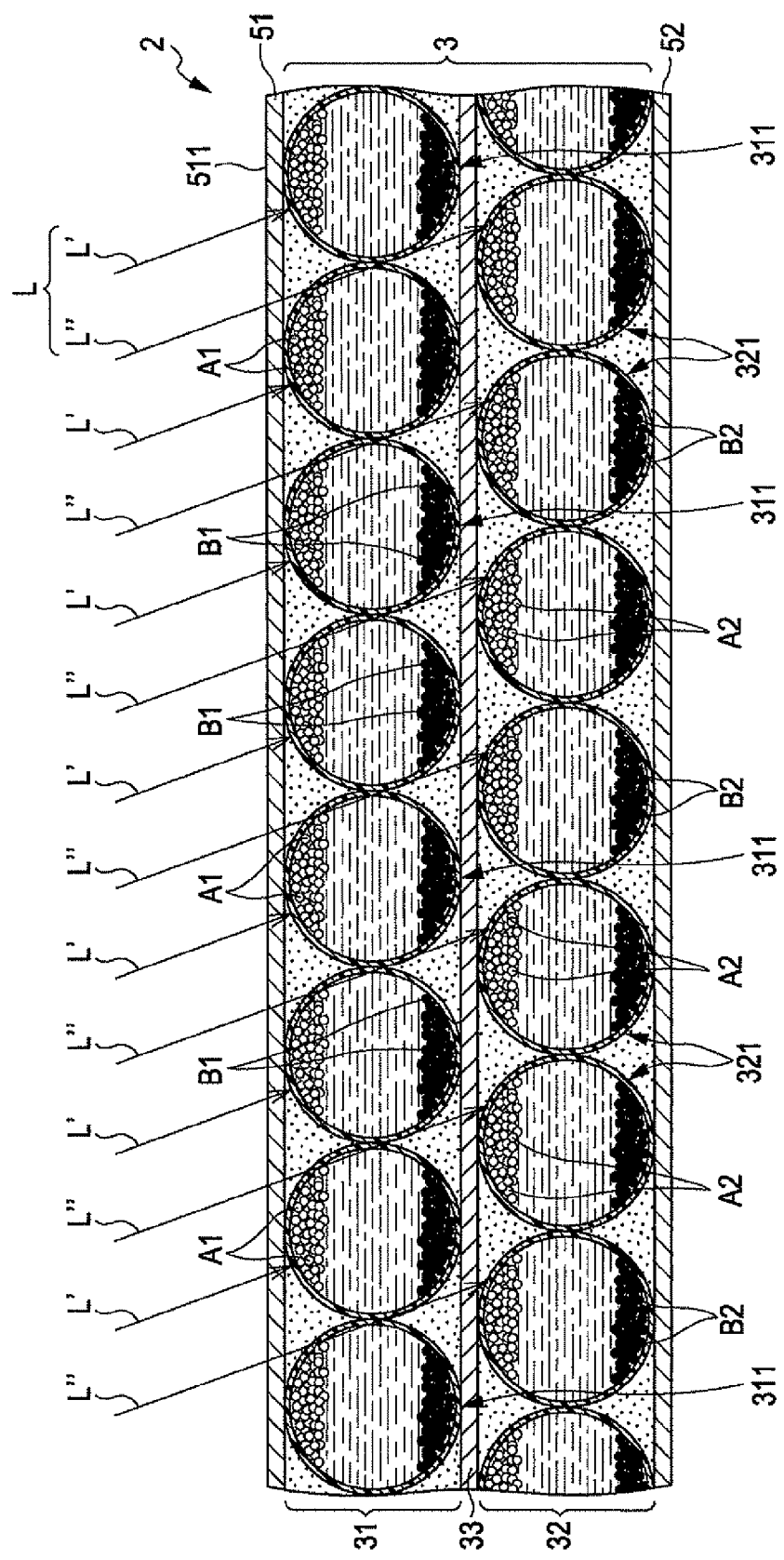
FIG. 11 is a cross-sectional view illustrating paths of light beams incident on the display sheet.
Figure 12:
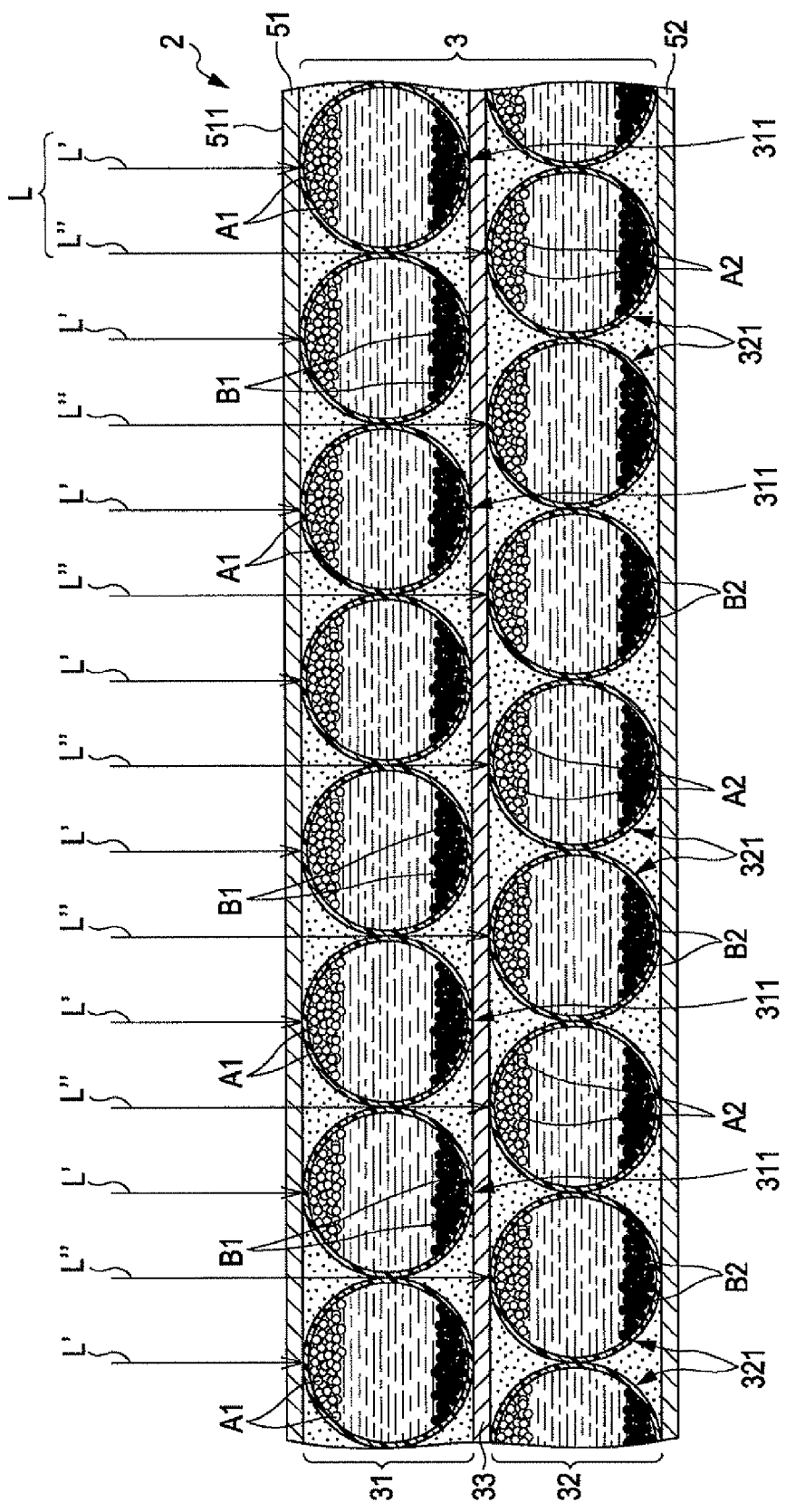
FIG. 12 is a cross-sectional view illustrating paths of light beams incident on the display sheet.

FIGS. 11 and 12 are each a cross-sectional view of the display sheet 2 where at least a part of the display surface 511 is in the white-displaying state. As shown in FIG. 11, when light beams L that slant with respect to the display surface 511 enter the display layer 3 through the display surface 511, a light beam L' among the light beams L is reflected by the positively-charged particles A1 in the first microcapsule 311 contained in the first display layer 31, and a light beam L" that passes through the first display layer 31 without being reflected by the positively-charged particles A1 is reflected by the positively-charged particles A2 in the second microcapsule 321 contained in the second display layer 32.

Furthermore, as shown in FIG. 12, when light beams L orthogonal to the display surface 511 enter the display layer 3 through the display surface 511, a light beam L' among the light beams L is reflected by the positively-charged particles A1 in the first microcapsule 311 contained in the first display layer 31, and a light beam L" that passes through the first display layer 31 without being reflected by the positively-charged particles A1 is reflected by the positively-charged particles A2 in the second microcapsule 321 contained in the second display layer 32.

Thus, in this embodiment, the light beams L enter the display layer 3 through the white-playing state portion of the display surface 511 can be more efficiently reflected by either the positively-charged particles A1 or A2.

Figure 13:
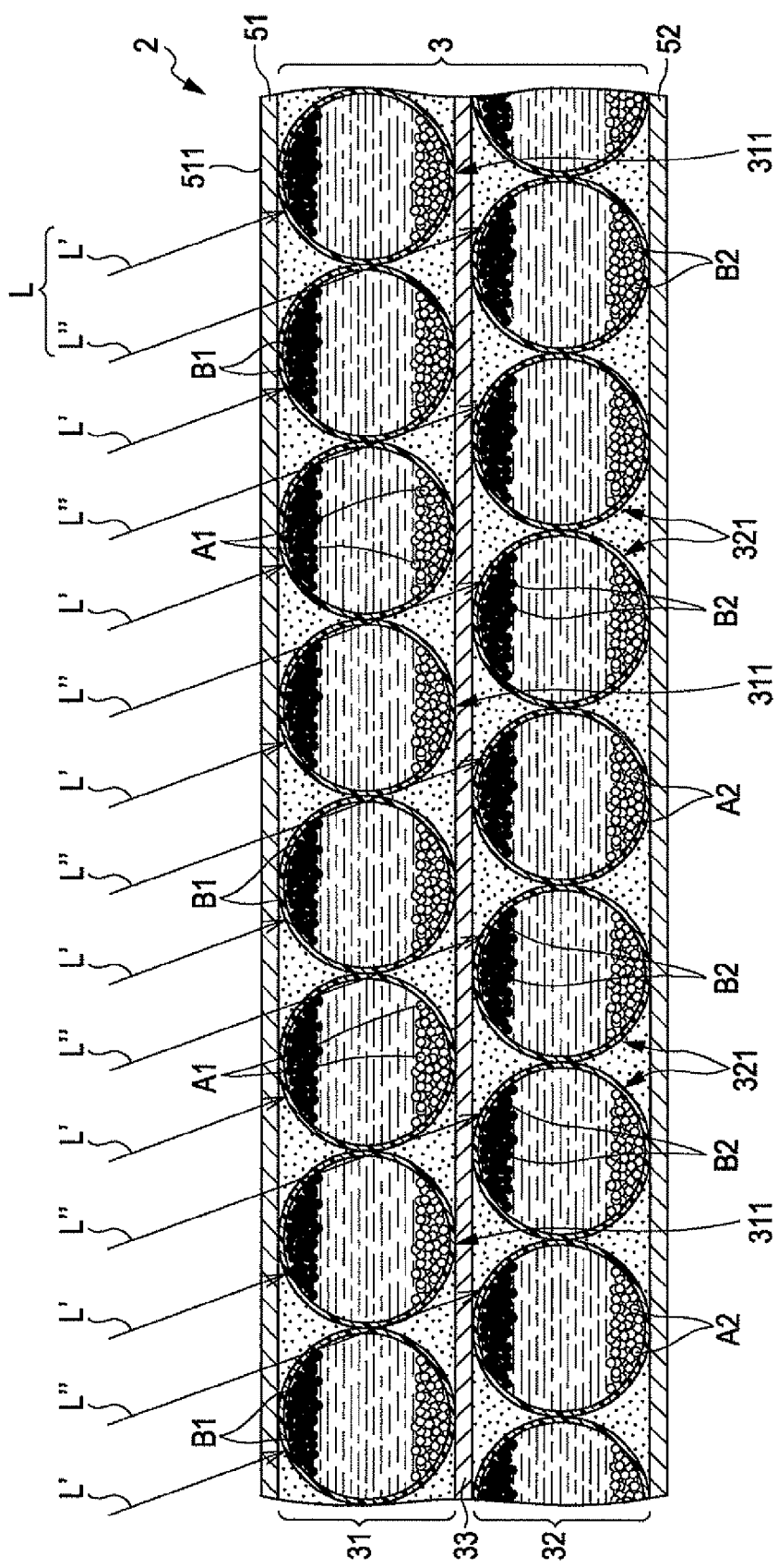
FIG. 13 is a cross-sectional view illustrating paths of light beams incident on the display sheet.
Figure 14:
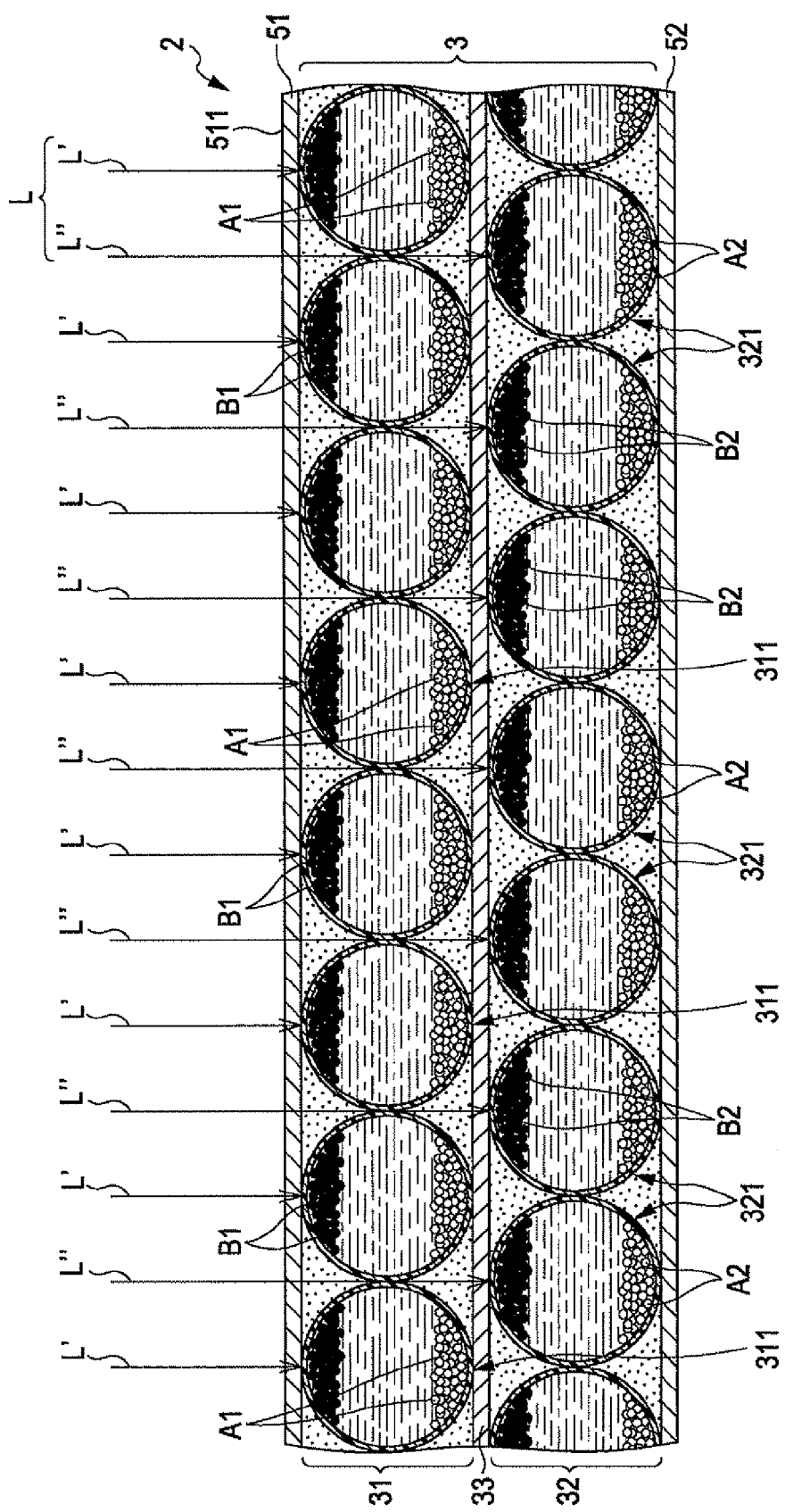
FIG. 14 is a cross-sectional view illustrating paths of light beams incident on the display sheet.

FIGS. 13 and 14 are each a cross-sectional view of the display sheet 2 where at least a part of the display surface 511 is in the black-displaying state. As shown in FIG. 13, when light beams L that slant with respect to the display surface 511 enter the display layer 3 through the display surface 511, a light beam L' among the light beams L is absorbed by the negatively-charged particles B1 in the first microcapsule 311 contained in the first display layer 31, and a light beam L" that passes through the first display layer 31 without being absorbed by the negatively-charged particles B1 is absorbed by the negatively-charged particles B2 in the second microcapsule 321 contained in the second display layer 32.

Furthermore, as shown in FIG. 14, when light beams L in the direction (z-axis direction) orthogonal to the display surface 511 enter the display layer 3 through the display surface 511, a light beam L' among the light beams L is absorbed by the negatively-charged particles B1 in the first microcapsule 311 contained in the first display layer 31, and a light beam L" that passes through the first display layer 31 without being absorbed by the negatively-charged particles B1 is absorbed by the negatively-charged particles B2 in the second microcapsule 321 contained in the second display layer 32.

Thus, in this embodiment, the light beams L enter the display layer 3 through the black-playing state portion of the display surface 511 can be more efficiently absorbed by either the negatively-charged particles B1 or B2.

Therefore, in such a display sheet 2, the light beams incident on the display layer 3 can be efficiently used, resulting in an increase in the brightness of images displayed on the display surface 511 and an increase in display contrast.

Thus, the second embodiment also can achieve advantageous effects similar to those of the first embodiment.

Third Embodiment

Next, a third embodiment of the display device (display device of the invention) to which the display sheet of the invention is applied will be described.

Figure 15:
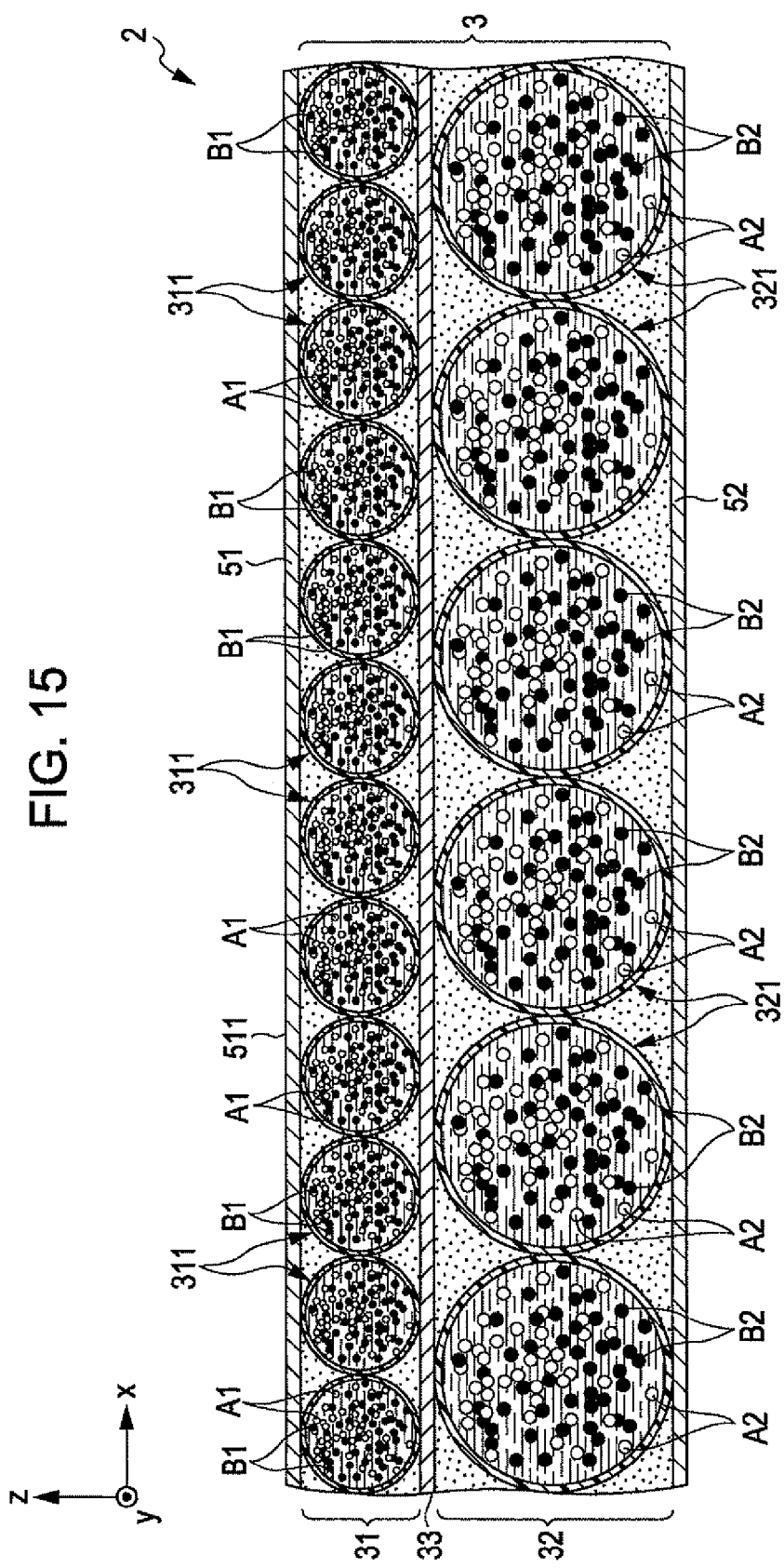
FIG. 15 is a cross-sectional view of the display sheet applied to the display device of the invention according to a third embodiment.
Figure 16:
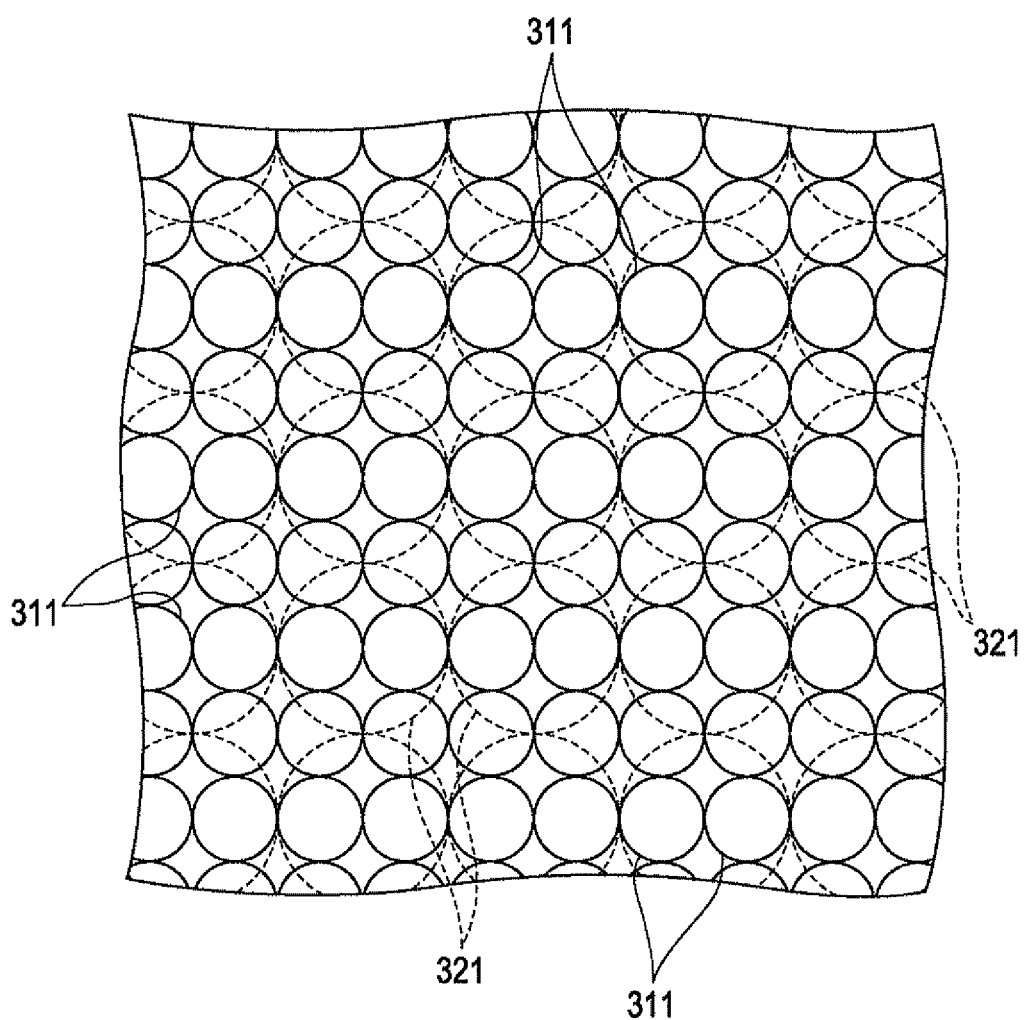
FIG. 16 is a top view of the display sheet shown in FIG. 15.

FIG. 15 is a cross-sectional view of the display sheet applied to the display device of the invention according to the third embodiment, and FIG. 16 is a top view of the display sheet shown in FIG. 15.

The display device according to the third embodiment will be described below, but the differences from the first embodiment will be mainly described, and descriptions on similar matters will be omitted.

The display device according to this embodiment has the same structure as that in the first embodiment except that the structure of the display layer 3 of the display sheet 2 is different.

As shown in FIGS. 15 and 16, in the display layer 3, the average particle diameter of the first microcapsules 311 is smaller than that of the second microcapsules 321. The average particle diameter of the first microcapsules 311 is not particularly limited, but is preferably a half or less of the average particle diameter of the second microcapsules 321. More specifically, for example, the average particle diameter of the first microcapsules 311 is about from 10 to 60 µm, and that of the second microcapsules 321 is preferably about from 60 to 120 µm.

Since the gap S formed by four adjacent first microcapsules 311 can be reduced in size by thus making the average particle diameter of the first microcapsules 311 smaller than that of the second microcapsules 321, the shielding ratio of the first display layer 31 for the light beams L is increased. In other words, the light beams L enter the display layer 3 through the display surface 511 can be more efficiently reflected by the positively-charged particles A1 or absorbed by the negatively-charged particles B1 in the first microcapsules 311 contained in the first display layer 31. Furthermore, the light beam L" passing through the first display layer 31 can be reflected by the positively-charged particles A2 or absorbed by the negatively-charged particle B2 in the second microcapsule 321 contained in the second display layer 32. Consequently, in the display sheet 2, the light beams incident on the display layer 3 can be efficiently utilized, resulting in an increase in the brightness of images displayed on the display surface 511 and an increase in the display contrast.

In the display sheet 2 having the first display layer 31 on the display surface 511 side, the resolution (size per pixel) varies depending on the particle diameters of the first microcapsules 311 contained in the first display layer 31 (the particle diameters of the second microcapsules 321 hardly affect the resolution). That is, the resolution is increased with a decrease in the particle diameter of the first microcapsules 311 and is decreased with an increase in the particle diameter of the first microcapsules 311. Therefore, by making the average particle diameter of the first microcapsules 311 smaller than that of the second microcapsules 321, as in this embodiment, the above-described advantageous effects can be achieved, and also the resolution of the display sheet 2 can be increased.

In addition, by making the average particle diameter of the first microcapsules 311 smaller than that of the second microcapsules 321, the thickness of the display layer 3 can be reduced while achieving the above-mentioned advantageous effects. With this, for example, the distance between the electrodes 82 and 83 can be made shorter than that in the first embodiment, and, as a result, the electric power for driving can be reduced (reduction in application voltage).

Thus, the third embodiment can also achieve the advantageous effects as in the first embodiment.

Fourth Embodiment

Next, a fourth embodiment of the display device (display device of the invention) to which the display sheet of the invention applied will be described.

Figure 17:
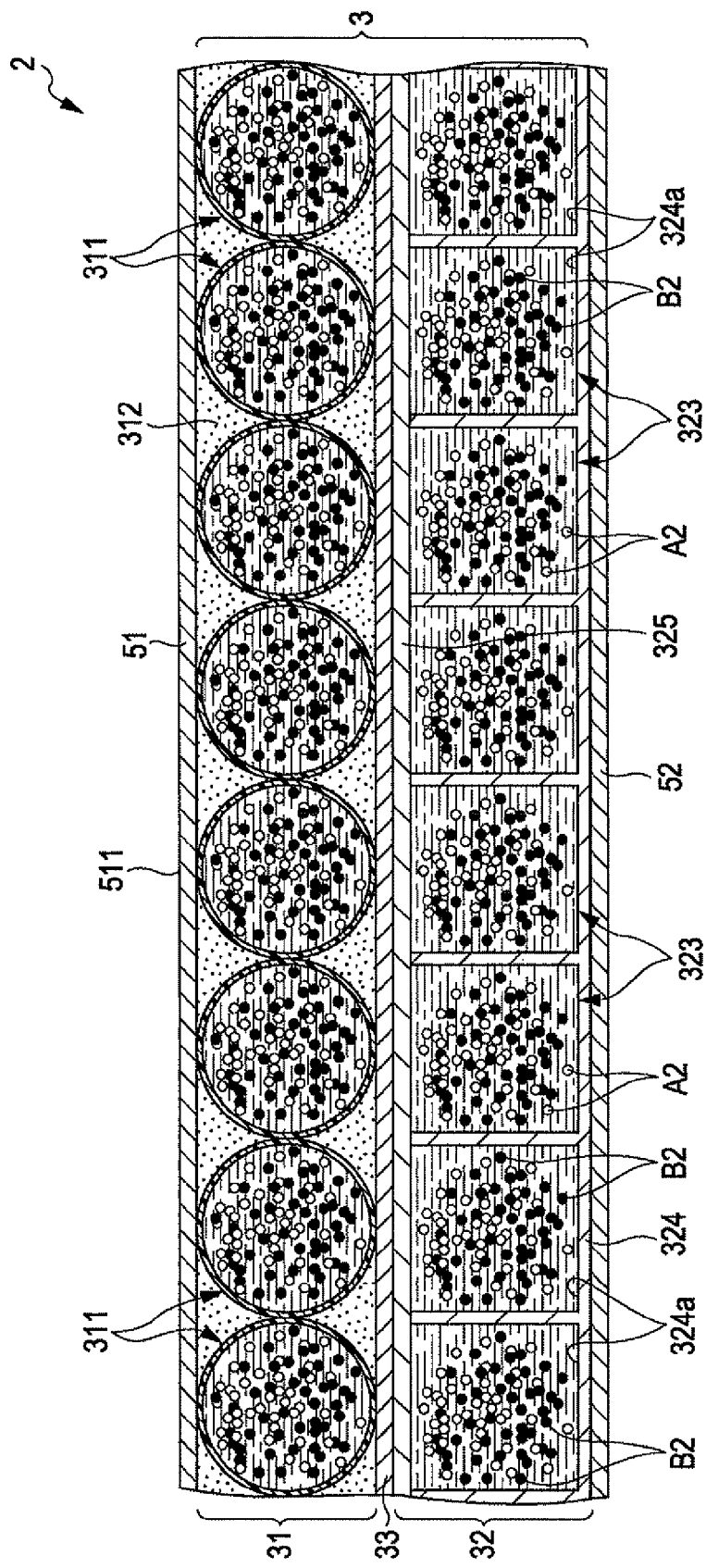
FIG. 17 is a cross-sectional view of the display sheet applied to the display device of the invention according to a fourth embodiment.

FIG. 17 is a cross-sectional view of the display sheet applied to the display device of the invention according to the fourth embodiment. Note that, hereinafter, the upper side in FIG. 17 is referred to as "upper", and the lower side is referred to as "lower", for convenience of explanation.

The display device according to the fourth embodiment will be described below, but the differences from the first embodiment will be mainly described, and descriptions on similar matters will be omitted.

The display device according to this embodiment has the same structure as that in the first embodiment except that the structure of the display layer 3 of the display sheet 2 is different.

As shown in FIG. 17, the display layer 3 includes a first display layer 31 and a second display layer 32. In these display layers, the first display layer 31 includes multiple first microcapsules (first containers) 311 as in the first embodiment. On the other hand, the second display layer 32 include multiple cells (second containers) 323.

The multiple cells 323 are constituted of a container box 324 having multiple recesses 324a each having an opening at the top side and a lid 325 joined to the upper face of the container box 324 so as to cover the openings of the recesses 324a. The inner space of each cell 323 is filled with an electrophoretic dispersion liquid where the second electrophoretic particle group (positively-charged particles A2 and negatively-charged particles B2) is dispersed in a liquid phase dispersion medium 62. The structure of the cells 323 is not limited to this. For example, the lid 325 may be omitted, and the intermediate layer 33 may be used instead of the lid. That is, the intermediate layer 33 may also serve as the lid 325.

By constituting the display layer 3 as the above, the mechanical strength of the display sheet 2 can be increased, and the brightness and the display contrast of images displayed on the display surface 511 can be increased.

In particular, in this embodiment, since the display layer containing the first microcapsules 311 having a certain level of elasticity is used as the first display layer 31 positioned on the display surface 511 side, in addition to the above-described advantageous effects, the external force applied to the display surface 511 by pressing the writing pen 84 to the display can be effectively absorbed or released by the first display layer 31.

Thus, the fourth embodiment can also achieve the advantageous effects as in the first embodiment.

Fifth Embodiment

Next, a fifth embodiment of the display device (display device of the invention) to which the display sheet of the invention applied will be described.

Figure 18:
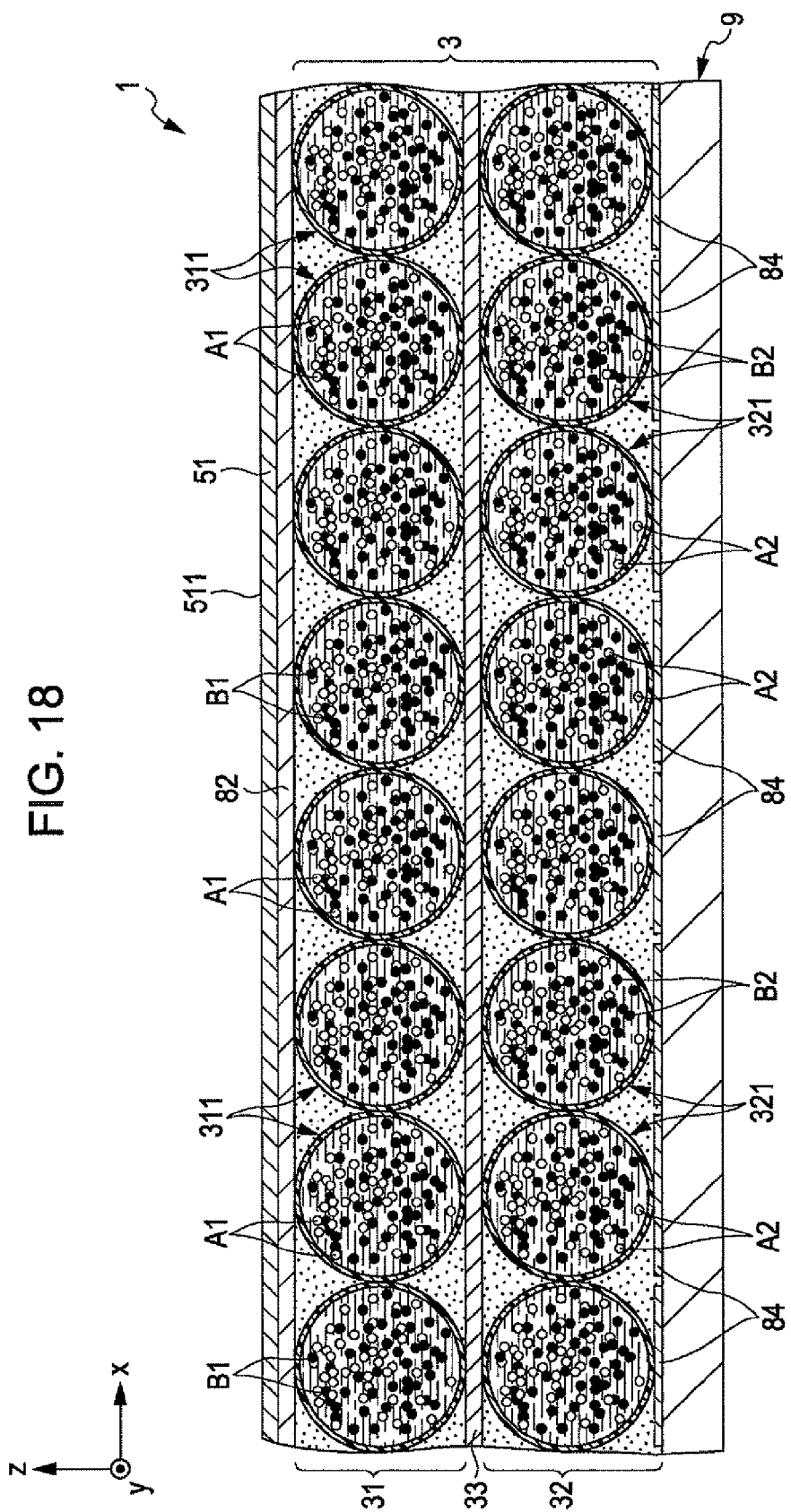
FIG. 18 is a cross-sectional view of the display device of the invention according to a fifth embodiment.

FIG. 18 is a cross-sectional view of the display device of the invention according to the fifth embodiment. Note that, hereinafter, the upper side in FIG. 18 is referred to as "upper", and the lower side is referred to as "lower", for convenience of explanation.

The display device according to the fifth embodiment will be described below, but the differences from the first embodiment will be mainly described, and descriptions on similar matters will be omitted.

The display device 1 according to this embodiment has the same structure as that in the first embodiment except that the writing device is omitted and that the display sheet is provided with an electrode. Note that the same elements as those of the first embodiment are designated with the same reference numerals.

As shown in FIG. 18, the display device 1 includes a display layer 3, a common electrode 82 disposed on the upper surface of the display layer 3, a protective sheet 51 disposed on the upper surface of the common electrode 82, and a circuit board (back plane) 9 disposed on the lower surface of the display layer 3 and having a plurality of partial electrodes 83. The circuit board 9 includes, for example, a circuit (not shown) including switching elements, such as TFTs, arranged so as to correspond to the respective partial electrodes 83.

In the display device 1 having such a structure, migration of the electrophoretic particles (positively-charged particles A1 and A2 and the negatively-charged particles B1 and B2) in the first microcapsule 311 and the second microcapsule 321 that are positioned between each partial electrode 83 and the common electrode 82 is controlled by determining for each partial electrode 83 whether or not a voltage is applied between the partial electrode 83 and the common electrode 82 to thereby display desired information (image) on the display surface 511.

Furthermore, in the display device 1 of this embodiment, since almost all the light beams enter the display layer 3 through the display surface 511 can be reflected or absorbed by the first display layer 31 (positively-charged particles A1, negatively-charged particles B1) and the second display layer 32 (positively-charged particles A2, negatively-charged particles B2), the light beams can be prevented from leaching the circuit board 9. Therefore, in the display device 1 of this embodiment, occurrence of photo-leakage current, which is caused by irradiation of the circuit board 9 with light, can be prevented or inhibited to thereby inhibit malfunction of the circuit elements.

Thus, the fifth embodiment can also achieve the advantageous effects as in the first embodiment.

Sixth Embodiment

Next, a sixth embodiment of the display device (display device of the invention) to which the display sheet of the invention applied will be described.

Figure 19:
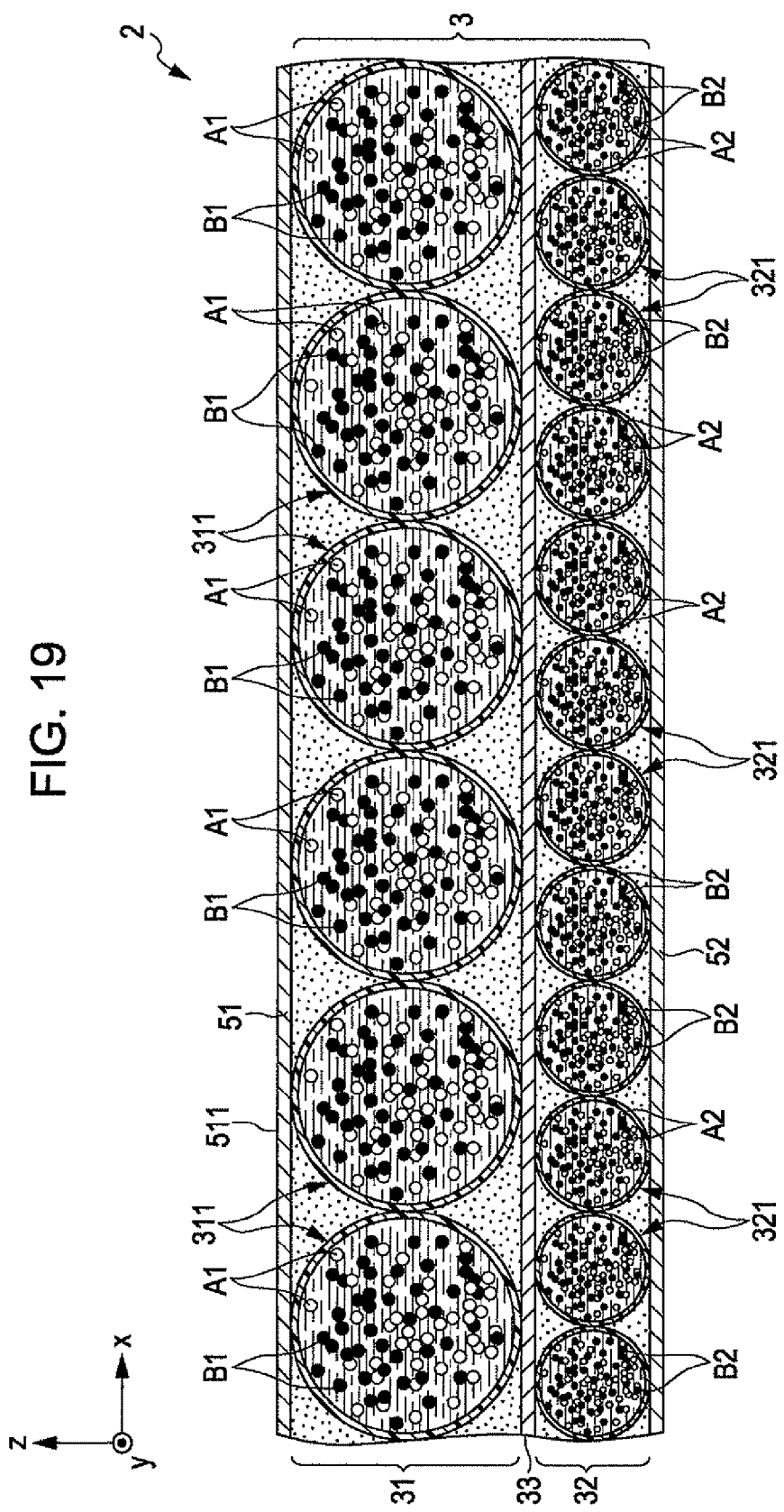
FIG. 19 is a cross-sectional view of the display sheet applied to the display device of the invention according to a sixth embodiment.
Figure 20:
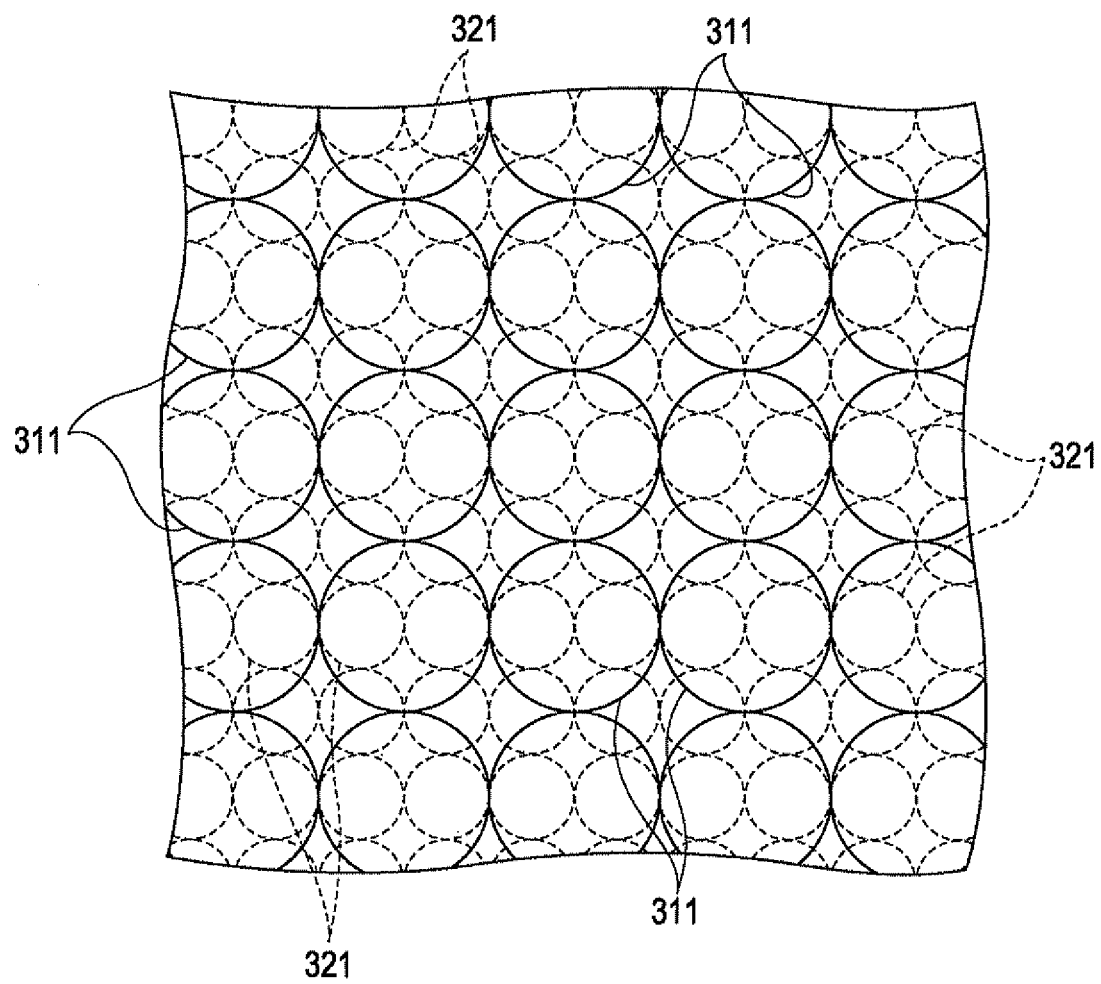
FIG. 20 is a top view of the display sheet shown in FIG. 19.

FIG. 19 is a cross-sectional view of the display sheet applied to the display device of the invention according to the sixth embodiment, and FIG. 20 is a top view of the display sheet shown in FIG. 19.

The display device according to the sixth embodiment will be described below, but the differences from the first embodiment will be mainly described, and descriptions on similar matters will be omitted.

The display device according to this embodiment has the same structure as that in the first embodiment except that the structure of the display layer 3 of the display sheet 2 is different.

As shown in FIGS. 19 and 20, in the display layer 3 of this embodiment, the average particle diameter of the first microcapsules 311 is larger than that of the second microcapsules 321. The average particle diameter of the first microcapsules 311 is not particularly limited, but is preferably two times or more that of the second microcapsules 321. More specifically, for example, the average particle diameter of the first microcapsules 311 is preferably about from 60 to 120 μm, and the average particle diameter of the second microcapsules 321 is preferably about from 10 to 60 μm.

By making the average particle diameter of the first microcapsules 311 larger than that of the second microcapsules 321, the following advantageous effects are obtained.

First Effect

If the particle diameter of the first microcapsules 311 is small, in the white-displaying state, the negatively-charged particles B1 may be seen from, for example, gaps between the positively-charged particles A1 gathered on the display surface 511 side. This is due to that the number of the positively-charged particles A1 that can be contained in the first microcapsule 311 is decreased and that the distance between the positively-charged particles A1 and the negatively-charged particles B1 in the white-displaying state is shortened. If the negatively-charged particles B1 are thus seen, the brightness of the white is decreased, and the contrast is reduced.

Therefore, when the average particle diameter of the first microcapsules 311 is relatively large (larger than the average particle diameter of the second microcapsules 321) as in this embodiment, the number of the positively-charged particles A1 that can be contained in the first microcapsule 311 can be made large, and the distance between the positively-charged particles A1 and the negatively-charged particles B1 in the white-displaying state can be made relatively long. As a result, the above-mentioned problem where the negatively-charged particles B1 are seen in the white-displaying state can be effectively prevented or inhibited to achieve high contrast.

On the other hand, since the average particle diameter of the second microcapsules 321 is smaller than that of the first microcapsules 311, for example, the gap S formed by four adjacent second microcapsules 321 is further reduced in size to thereby increase the shielding ratio of light at the second display layer 32. Therefore, the light beam passes through the first display layer 31 and enters the second display layer 32 can be efficiently reflected or absorbed. As a result, in particular, in the white-displaying state, clearer white can be displayed.

Here, in order to make the effect more significant, for example, the following structure may be employed. That is, the number (density) of the positively-charged particles A1 contained in the first microcapsule 311 per unit volume is preferably larger than the number (density) of the positively-charged particles A2 contained in the second microcapsule 321 per unit volume, specifically, the number of the positively-charged particles A1 is preferably 1.1 times or more the number of the positively-charged particles A2.

By doing so, in the first microcapsule 311 in the white-displaying state, the negatively-charged particles B1 are further prevented from being seen.

In the second microcapsule 321, the probability that each particle collide with other particle is decreased due to the decrease in the density of the positively-charged particles A2, which causes easy migration of the positively-charged particles A2 and the negatively-charged particles B2. Consequently, in the white-displaying state, the positively-charged particles A2 can be further surely gathered on the display surface 511 side in the second microcapsule 321 to thereby more efficiently reflect the light beam incident on the second display layer 32.

Thus, higher contrast can be achieved by making the density of the positively-charged particles A1 contained in the first microcapsules 311 larger than that of the positively-charged particles A2 contained in the second microcapsules 321.

In the above, the densities of the positively-charged particles A1 and A2 are controlled by adjusting the numbers of the positively-charged particles A1 and A2, but the method of controlling the densities is not limited thereto.

For example, the density of the positively-charged particles A1 contained in the first microcapsule 311 may be made larger than that of the positively-charged particles A2 contained in the second microcapsule 321 by making the average particle diameter of the positively-charged particles A1 larger than that of the positively-charged particles A2, while the number of the positively-charged particles A1 contained in the first microcapsule 311 and the number of the positively-charged particles A2 contained in the second microcapsule 321 are approximately the same. Furthermore, the positively-charged particles A1 and A2 may be different in both the number of particles per unit volume and the average particle diameter.

However, among these methods, most preferred is the method of making the numbers of particles per unit volume different. This is because that, in the first microcapsule 311, a larger difference between the dielectric constant of the liquid phase dispersion medium 61 and the dielectric constant of the positively-charged particles A1 makes the white-displaying brighter, but an increase in the average particle diameter of the positively-charged particles A1 reduces the difference between the dielectric constant of the liquid phase dispersion medium 61 and the dielectric constant of the positively-charged particles A1, which may decrease the brightness of white. Therefore, it is preferred to reduce the average particle diameter of the positively-charged particles A1 as much as possible. From these reasons, the method of making the numbers of particles per unit volume different is most preferred.
Second Effect According to the structure of this embodiment, the thickness of the display layer 3 can be reduced as in the third embodiment. With this, since the distance between the electrodes 82 and 83 can be reduced compared to, for example, the first embodiment, the electric power for driving can be reduced.

Thus, according to this embodiment, reduction in the electric power for driving can be achieved while keeping high contrast.

Thus, the sixth embodiment can also achieve the advantageous effects as in the first embodiment.

Seventh Embodiment

Next, a seventh embodiment of the display device (display device of the invention) to which the display sheet of the invention applied will be described.

Figure 21:
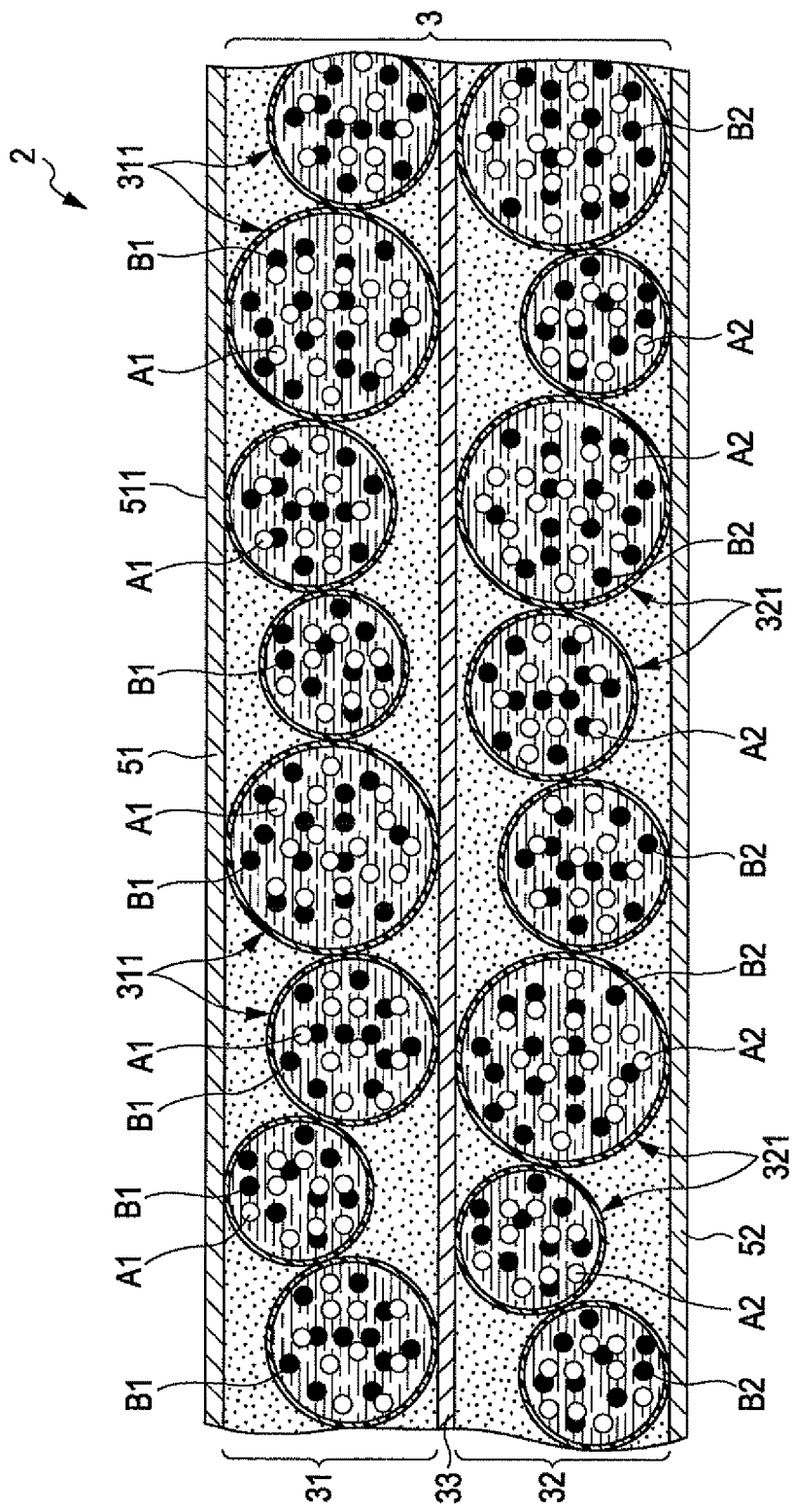
FIG. 21 is a cross-sectional view of a display sheet applied to the display device of the invention according to a seventh embodiment.

FIG. 21 is a cross-sectional view of the display sheet applied to the display device of the invention according to the seventh embodiment.

The display device according to the seventh embodiment will be described below, but the differences from the first embodiment will be mainly described, and descriptions on similar matters will be omitted.

The display device according to this embodiment has the same structure as that in the first embodiment except that the structure of the display layer 3 of the display sheet 2 is different.

As shown in FIG. 21, the multiple first microcapsules 311 contained in the first display layer 31 have different particle diameters, and the multiple second microcapsules 321 contained in the second display layer 32 have different particle diameters.

In the first microcapsules 311, particle size variation tends to occur in manufacturing, and the particles are sorted using, for example, sieves. However, there is a limitation in the precision of sorting, and, actually, as shown in FIG. 21, the first microcapsules 311 contained in the first display layer 31 are different in particle diameter (which is also the same in the second display layer 32).

Even in the seventh embodiment, advantageous effects similar to those in the first embodiment can be achieved.
Electronic Apparatus The thus described display devices 1 (in particular, the display device according to the fifth embodiment) can be applied to various electronic apparatuses. Examples of the electronic apparatus having the display device of the invention include electronic papers, electronic books, televisions, view finder-type and monitor direct view-type video tape recorders, in-car navigation systems, pagers, electronic notepads, calculators, electronic newspapers, word processors, personal computers, workstations, TV telephones, POS terminals, and devices having touch panels.

As a representative example of these electronic apparatuses, an electronic paper will be specifically described.

Figure 22:
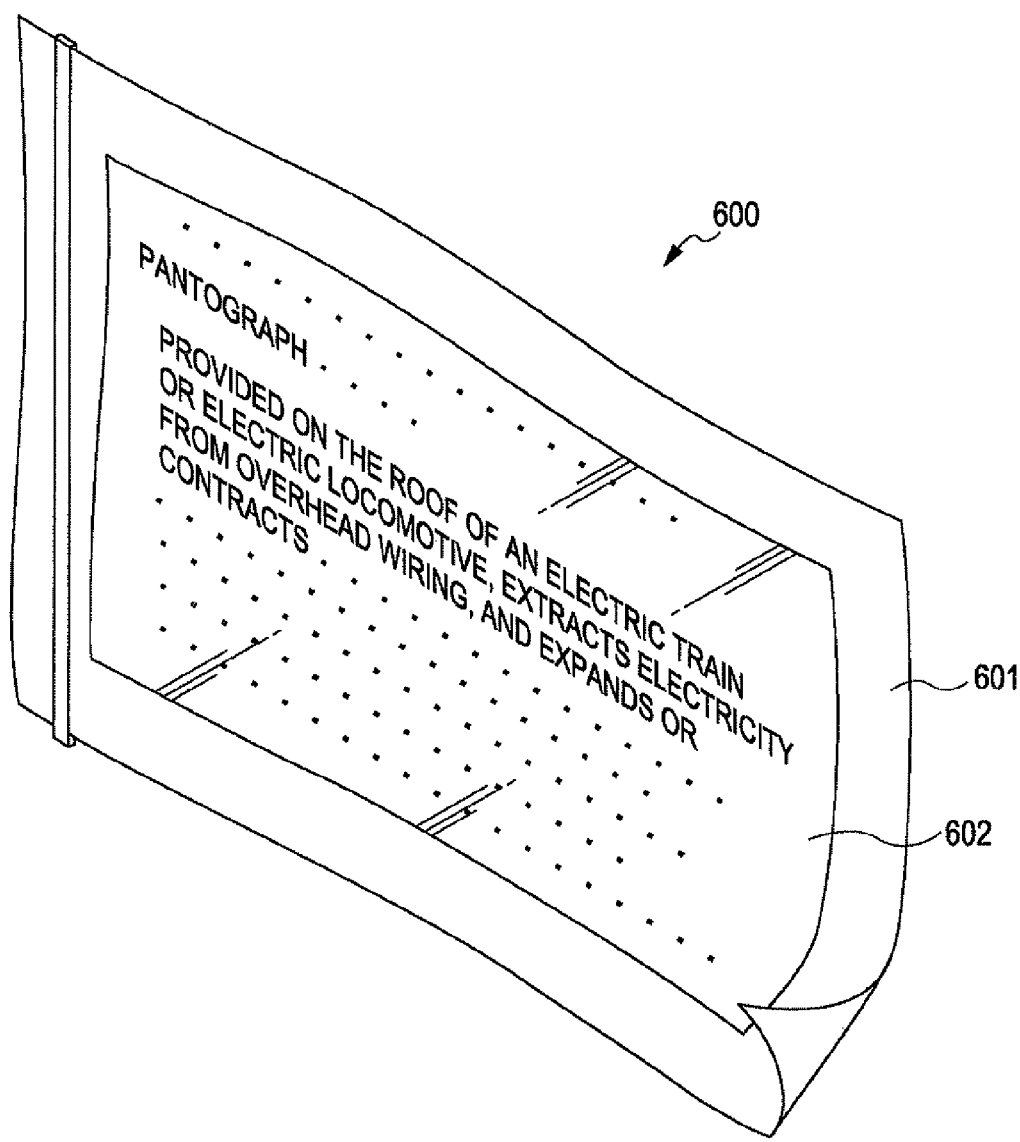
FIG. 22 is a perspective view illustrating an embodiment when the electronic apparatus of the invention is applied to an electronic paper.

FIG. 22 is a perspective view illustrating an embodiment when the electronic apparatus of the invention is applied to an electronic paper.

The electronic paper 600 shown in FIG. 22 includes a body 601 made of a rewritable sheet having texture and flexibility similar to those of paper and a display unit 602. In this electronic paper 600, the display unit 602 is made of the above-described display device 1.

Next, an embodiment where the electronic apparatus of the invention is applied to a display will be described.

Figure 23A:
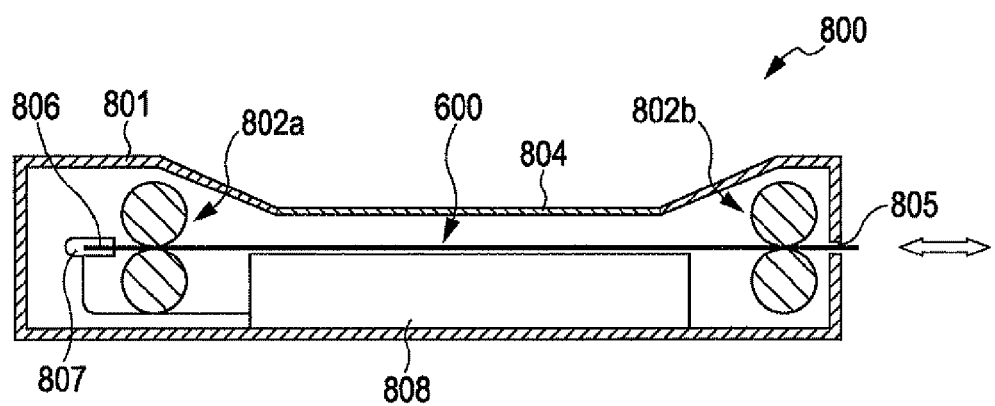
FIGS. 23A and 23B are diagrams illustrating an embodiment when the electronic apparatus of the invention is applied to a display.
Figure 23B:
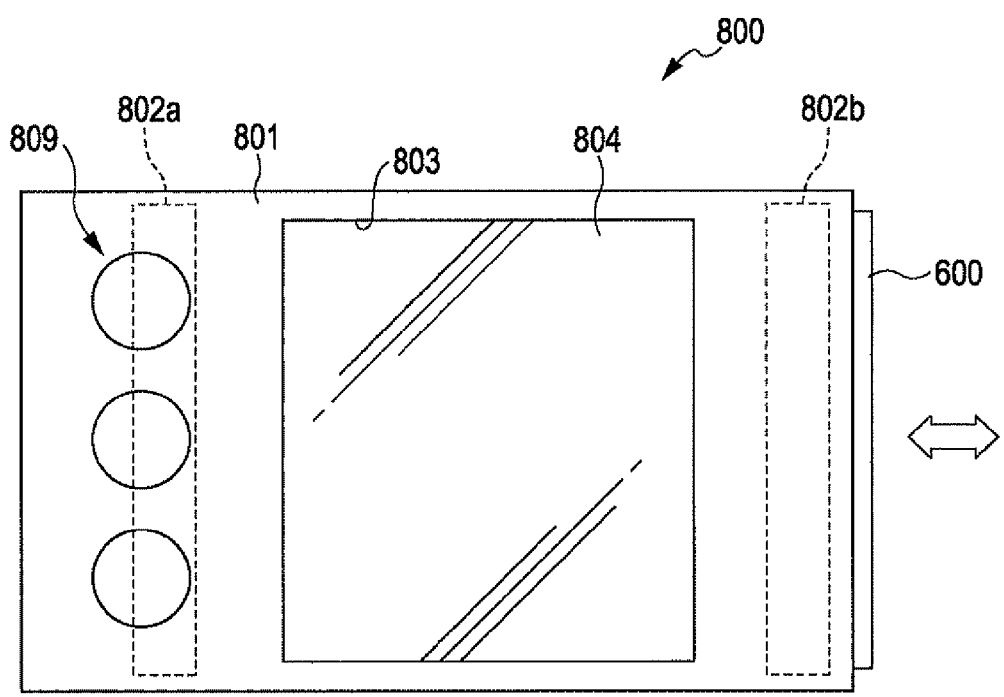

FIGS. 23A and 23B are diagrams illustrating an embodiment when the electronic apparatus of the invention is applied to a display wherein FIG. 23A is a cross-sectional view, and FIG. 23B is a plan view.

The display (display device) 800 shown in FIGS. 23A and 23B include a body 801 and an electronic paper 600 detachably provided to the body 801. The electronic paper 600 has a structure similar to that described above, that is, a structure similar to that shown in FIG. 22.

The body 801 has a feeding inlet 805 into which the electronic paper 600 can be inserted at one side (the right side in FIG. 23A) and has two pairs of feeding rollers 802a and 802b in the inside. The electronic paper 600 inserted in the body 801 through the feeding inlet 805 is mounted on the body 801 in the state that the electronic paper 600 is held by the feeding rollers 802a and 802b.

In addition, the body 801 has a rectangular opening 803 at the display surface side (forward side in the plane of the paper of FIG. 23B) and a transparent glass plate fit into the opening 803. By doing so, the electronic paper 600 set to the body 801 can be visually recognized from the outside of the body 801. That is, in this display 800, the display surface is made of the electronic paper 600 set to the body 801 so as to be viewed through the transparent glass plate 804.

The electronic paper 600 is provided with a terminal portion 806 at the end in the feeding direction (left side in FIG. 23A), and a socket 807 that is connected to the terminal portion 806 when the electronic paper 600 is set to the body 801 is provided to the inside of the body 801. The socket 807 is electrically connected to a controller 808 and an operation portion 809.

In this display 800, the electronic paper 600 is detachably set to the body 801 and also can be carried with a user and used in the state being detached from the body 801.

Based on the embodiments shown in the drawings, the display sheet, the display device, and the electronic apparatus of the invention have been described above, but the invention is not limited thereto. For example, in the display sheet, the display device, and the electronic apparatus of the invention, the structure of each portion can be replaced by another one having an arbitrary structure that can exhibit a similar function, or another structure may be added. Furthermore, the embodiments can be arbitrarily combined.

Furthermore, in the above-described embodiments, structures each having a first display layer and a second display layer have been described, but the number of the display layer is not particularly limited, and the display sheet may have three or more display layers.

Furthermore, in the above-described embodiments, structures enabling to display black-and-white images have been described, but the structure may be, for example, a structure that is possible to display color images (preferably, full-color images) by disposing a farrah filter on the surface of a display layer on the display layer side.

Furthermore, in the above-described embodiments, structures where positively-charged particles and negatively-charged particles are dispersed in microcapsules when no electric field is applied have been described, but the structure is not limited thereto. The structure may be, for example, a structure where both positively-charged particles and negatively-charged particles are in contact with the inner walls of microcapsules (capsule body) when no electric field is applied and move along the inner walls of the microcapsules when an electric field is applied.

Furthermore, in the above-described embodiments, structures where the microcapsules are filled with an electrophoretic dispersion liquid have been described, but the structure is not limited thereto. The structure may be, for example, a structure where positively-charged white powder (particles) and negatively-charged black powder (particles) are scattered in microcapsules.

What is claimed is:

1. A display sheet comprising:
   a display layer that includes: (1) a first display layer having multiple first containers each containing a first electrophoretic particle group, and (2) a second display layer disposed on one surface side of the first display layer and having multiple second containers each containing a second electrophoretic particle group;
   the first electrophoretic particle group includes: (1) first positively-charged particles that are positively charged, and (2) first negatively-charged particles that are negatively charged, the first positively-charged particles having a color different from the first negatively-charged particles;
   the second electrophoretic particle group includes: (1) second positively-charged particles that are positively charged and having the same color as that of the first positively-charged particles, and (2) second negatively-charged particles that are negatively charged and having the same color as that of the first negatively-charged particles; and
   an intermediate layer disposed between the first display layer and the second display layer, the intermediate layer being conductive in a thickness direction and nonconductive in a lateral direction when an x-axis and a y-axis are set so as to perpendicularly intersect each other in a planar view of the display layer, wherein
   each of the multiple first containers overlaps at least one of the multiple second containers in a planar view of the display layer, and
   when the x-axis and the y-axis are set so as to perpendicularly intersect each other in a planar view of the display layer, each of the multiple second containers partially overlaps at least one of the multiple first containers so as to shift from each other in at least one axial direction of the x-axis and the y-axis.

2. The display sheet according to claim 1, wherein when an electric field in the thickness direction of the display layer is applied to a predetermined first container and the second container overlapping the first container, at least a part of the first electrophoretic particle group contained in the first container and at least a part of the second electrophoretic particle group contained in the second container show similar behavior.

3. The display sheet according to claim 1, wherein when an electric field in the thickness direction of the display layer is applied to the first container and the second container overlapping the first container, both the first positively-charged particles and the second positively-charged particles migrate toward one surface side of the display layer, and both the first negatively-charged particles and the second negatively-charged particles migrate toward the other surface side of the display layer.

4. The display sheet according to claim 1, wherein the average maximum width of the multiple first containers is equal to that of the multiple second containers in a planar view of the display layer.

5. The display sheet according to claim 1, wherein the average maximum width of the multiple first containers is different from that of the multiple second containers in a planar view of the display layer.

6. The display sheet according to claim 5, wherein the average maximum width of the multiple first containers is narrower than that of the multiple second containers in a planar view of the display layer.

7. The display sheet according to claim 1, wherein the first containers or the second containers or the both are microcapsules.

8. The display sheet according to claim 7, wherein both the first containers and the second containers are microcapsules.

9. The display sheet according to claim 7, wherein either the first containers or the second containers is the microcapsules, and the other is cells including a container box having recesses and a lid covering openings of the recesses.

10. The display sheet according to claim 9, wherein the first containers are microcapsules, and the second containers are the cells.

11. A display device comprising:
    a display sheet according to claim 1; and
    a pair of electrodes that are oppositely arranged with the display layer therebetween.

12. The display device according to claim 11, wherein the pair of electrodes include a common electrode disposed on the second display layer side and arranged so as to contain the display layer; and a partial electrode disposed on the first display layer side so as to be movable with respect to the display sheet and being able to apply a voltage to a partial region of the display layer between the partial electrode and the common electrode.

13. The display device according to claim 12, wherein the common electrode is detachable from the display sheet.

14. An electronic apparatus comprising a display device according to claim 11.

* * * * *